United States Patent [19]

Vidovic

[11] 3,878,557

[45] Apr. 15, 1975

[54] COLOR FRAMING VIDEOTAPE RECORDING APPARATUS AND METHOD

[75] Inventor: Nikola Vidovic, Santa Clara, Calif.

[73] Assignee: International Video Corporation, Sunnyvale, Calif.

[22] Filed: Mar. 15, 1974

[21] Appl. No.: 451,525

[52] U.S. Cl. .................................................. 358/4

[51] Int. Cl. .......................................... H04n 5/78

[58] Field of Search ........... 358/4; 178/6.6 A, 6.6 R, 178/69.5 TV, 69.5 CB

[56] References Cited

UNITED STATES PATENTS

| | | | |
|---|---|---|---|
| 3,735,015 | 5/1973 | Mesak | 358/4 |
| 3,761,604 | 9/1973 | Ozawa et al. | 358/4 |

*Primary Examiner*—Robert L. Griffin
*Assistant Examiner*—Mitchell Saffian
*Attorney, Agent, or Firm*—Limbach, Limbach & Sutton

[57] ABSTRACT

Automatic color framing for editing in a video tape recorder is provided by associating one of the two possible color frame phases with one of the two possible phase relationships between the off-tape color burst and the incoming video color burst. If this association results in the locking of the video tape recorder to the incorrect color frame, the association of the input color burst phase relationship to the color frame phases is reversed to provide correct color framing in subsequent edits in response to the off-tape to input video color burst phase so long as the input video horizontal sync to color burst phase remains substantially constant.

9 Claims, 17 Drawing Figures

DIGITAL DELAY SYSTEM

COLOR FRAMING VIDEOTAPE RECORDING APPARATUS AND METHOD

BACKGROUND OF THE INVENTION

The present invention relates to video tape recorders (VTR's) and, more particularly, to electronic editing of NTSC color television signals on a VTR. The present invention is useful in all types of high quality VTR's, including both "quadruplex" and "helical scan" type VTR's.

In the process of editing tapes on a VTR, either a series of new segments are recorded in sequence ("assemble" editing) or a new segment is recorded in a previously recorded segment ("insert" editing). In either case, the precise "timing" of the ultimately recorded sequence must not vary and particularly the timing at the beginning and end of segments must match that of adjacent segments. By timing is meant the phase of the horizontal synchronization pulses of the recorded video signal. Such requirements are well known in the art.

Typically, in playback modes of VTR operation, the off-tape horizontal pulses are locked to a reference signal ("horizontal lock") by means of a phase locked servo arrangement which controls the rotational phase of the mechanical scanner member which carries the VTR record/playback heads.

A problem in editing is that the horizontal lock is obviously inoperative during record. A prior art technique is to place the VTR in the "tachometer" mode (i.e. — the playback timing is not finely controlled by locking the horizontal pulses to a reference, but instead is coarsely controlled, the scanner tachometer is phase locked to reference tachometer pulses, such tachometer pulses occurring at a slower rate than the horizontal pulses and such pulses not related to a signal reproduced by the VTR) and manually adjusting the tachometer reference (or equivalent) to secure zero horizontal error which is usually adequate to assure proper timing in subsequent edit record sequences. This approach requires additional set up time and operator skill.

An automatic means for securing zero horizontal error during edit record sequences is the subject of U.S. patent application Ser. No. 356,839 of Bert H. Dann, filed May 3, 1973, now abandoned, entitled "Videotape Recorder Editing Apparatus." According to the teachings of that application, the horizontal error during edit playback is stored to provide the same error correction during edit record sequences thereby maintaining the same timing throughout the recorded material.

Nevertheless, a further problem occurs in the editing of color television signals. In order to fully appreciate this problem one must consider not only the nature of the color television signal itself but also the action of time base correctors which are almost universally employed in high quality VTR's, particularly VTR's used in broadcasting. These problems are discussed in an article "The Problems of Splicing and Editing Color Video Magnetic Tape" by C. A. Anderson in the *IEEE Transactions on Broadcasting*, Vol. BC-15, No. 3, September, 1969.

First, with regard to the color television signal itself, there are two points to consider. With respect to a particular video source, a "color" frame is two "monochrome" frames. That is, because the NTSC color burst shifts phase 180° each frame, it is two frames before the same phase is repeated. Also, the phase of the color burst with respect to the horizontal sync pulse is not defined. While this phase relation will typically be stable as to a particular video source, it will not be the same in different video sources. It will therefore be apparent that the color frame is not uniquely defined in any manner.

Second, with regard to time base correctors, a typical correction scheme in a color VTR includes two variable delay lines in series to remove residual time base errors still present despite a horizontal locking of the VTR servo systems. The first delay line is controlled by an error signal derived by comparison of off-tape to the input video horizontal sync pulses. The input video signal is the signal which is to be edited into material previously recorded on the tape. In most circumstances the input video signal will have a highly stable horizontal sync and color burst and the phase relation between sync and burst, whatever it may be, remains stable. The second delay line provides a fine correction under the control of an error signal comparing off-tape burst to a subcarrier derived from the input video signal. As will be explained, it is this last correction that causes color editing problems.

As part of the VTR "lock-up" sequence, the VTR synchronizes the off-tape monochrome frame to the input video monochrome frame. Because there is no way to identify the color frame the machine has a fifty-fifty chance of locking to the correct color frame. In either case, the VTR proceeds to achieve horizontal lock to the input video signal. Thus, the horizontal sync pulses are closely in phase at the output of the machine and even more closely in phase at the output of the first delay line in the time base corrector. However, prior to the second delay line, the phase difference between the reference subcarrier and the off-tape color burst is either $\Theta$ or $\Theta + 180°$ depending on which phase of the color frame the VTR happened to lock to. The phase angle $\Theta$ indicates the difference in phase between the input video color burst and the off-tape color burst due to the undefined phase relationship between the horizontal sync and color burst of any NTSC color television signal. In either case, the second delay line will resolve the phase difference $\Theta$ or $\Theta + 180°$.

However, at an edit point, if the second delay line suddenly must change from resolving a $\Theta$ to a $\Theta + 180°$ error or vice-versa there is an abrupt 180° shift. Such a shift is equivalent to 140 nanoseconds of delay and results in a disturbing and noticeable sideways jump in the reproduced picture from the VTR. This effect is particularly disturbing in animation.

SUMMARY OF THE INVENTION

In accordance with the teachings of the present invention a method and apparatus are provided for achieving automatic NTSC color framing in a VTR to overcome the aforementioned problem.

The off-tape color burst, processed to remove jitter, is compared to the input video color burst, also processed to remove jitter. So long as the same input video signal is applied (or so long as the input video signal has sync and burst derived from a single stable generator) the phase of the horizontal sync to burst in the input video signal and in the off-tape video signal will each remain constant. However, the relative phase of the off-tape burst and input video burst will either be $\Theta$ or $\Theta + 180°$ depending on which phase of the color frame that the VTR happens to lock to. By comparing the input color burst to the off-tape color burst the relative phase relation of those two bursts can be stored. Then, for example, a test edit can be made to provide a visual determination if the VTR locked to the wrong color frame phase by looking for a sideways jump in the reproduced picture at the edit point. Circuitry is then programmed to select the correct phase of the color frame by comparing the relative off-tape to input video color burst phases. For the particular input video signal source and off-tape video signal the relative burst phase requires a selection of a particular color frame phase. Having found that relationship the VTR will automatically lock to the correct color frame upon comparing the two color burst phases. The VTR may even be turned off and days or weeks may pass once this relationship is initially determined and automatic lock to the correct frame will still occur so long as the horizontal sync to color burst phase of the input video signal does not change substantially.

These and other advantages and features of the invention will be recognized more fully as the detailed description of the preferred embodiments, claims and accompanying drawings are read and understood.

DESCRIPTION OF THE PREFERRED EMBODIMENTS

In order to completely understand the present invention, various details of an exemplary VTR are disclosed for the purposes of a complete disclosure. It will be understood that the invention is not limited to the context of the particular VTR of which portions are herein described. The overall exemplary VTR is described in greater detail in the following copending applications and patents, assigned to the present assignee, all of which are incorporated herewith by reference:

| Patent No. | Title | Issued | Inventor(s) |
|---|---|---|---|
| 3,783,398 | FM PULSE AVERAGING DEMODULATOR | 1- 1-74 | Bert H. Dann |
| 3,809,809 | TECHNIQUE FOR DETECTING LONG DURATION PULSES FROM A TRAIN OF SHORT DURATION PULSES | 5- 7-74 | Nikola Vidovic |
| 3,862,355 | HELICAL SCAN WIDEBAND TAPE RECORDER APPARATUS AND METHOD | 1-21-75 | Barett E. Guisinger |
| 3,852,617 | PASSIVE PEAK DETECTOR AND LEVEL SHIFTER | 12- 3-74 | Nikola Vidovic |
| 3,843,957 | VIDEO PROCESSING CURCUIT | 10-22-74 | Nikola Vidovic |
| 3,806,794 | PHASE SHIFTER APPARATUS | 4-23-74 | Nikola Vidovic |

| Application Ser. No. | Title | Filed | Inventor(s) |
|---|---|---|---|
| 285,919 | SYNCHRONIZING PULSE PROCESSOR FOR A VIDEO TAPE RECORDER | 9- 1-72 | Bert H. Dann and Nikola Vidovic |
| 285,917 | VIDEO TAPE RECORDER METHOD AND APPARATUS | 9- 1-72 | Kenneth Louth |
| 354,227 | MAGNETIC TAPE TRANSPORT SYSTEM | 4-25-73 | Frank S. C. Mo and Vernon Natwick |
| 355,220 | VIDEOTAPE RECORDER AND REPRODUCER VELOCITY COMPENSATOR APPARATUS | 4-27-73 | Barrett E. Guisinger and Bert H. Dann |
| 356,380 | VIDEO TAPE RECORDER METHOD AND APPARATUS | 5- 2-73 | Kenneth Louth |

–Continued

| Ser. No. | Title | Filed | Inventor(s) |
|---|---|---|---|
| 356,839 | VIDEO TAPE RECORDER EDITING APPARATUS, now abandoned | 5-03-73 | Bert H. Dann |
| 439,093 | VIDEOTAPE RECORDER AND REPRODUCER VELOCITY COMPENSATOR APPARATUS | 2-04-74 | Bert H. Dann and Barrett E. Guisinger |

Figure 2:
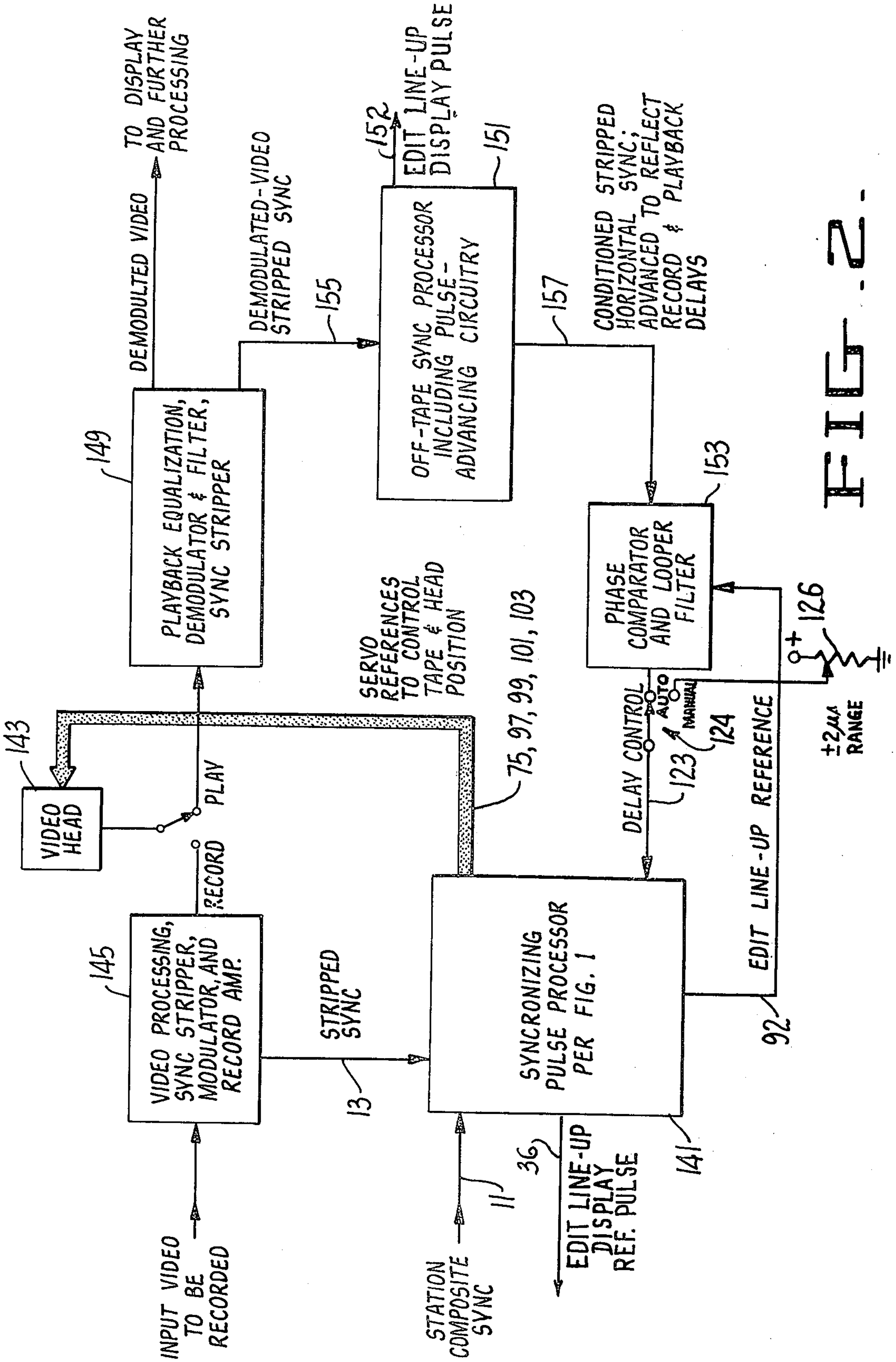
FIG. 2 is a block diagram showing use of the input synchronizing signal processor of FIG. 1 in edit modes.
Figure 3:
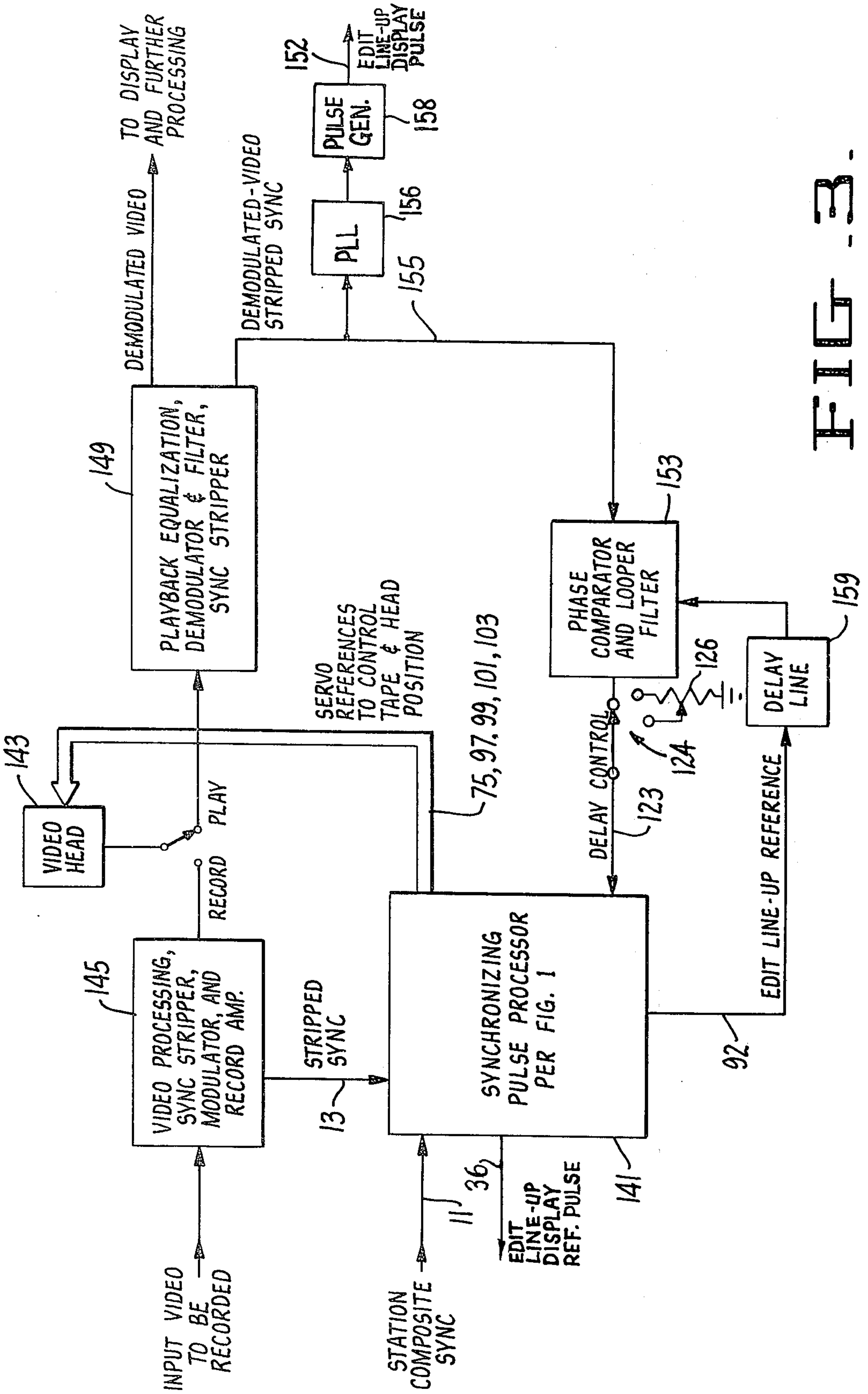
FIG. 3 is a block diagram showing an alternative embodiment of FIG. 2.

An essential portion of a VTR in which the present invention is to operate is a means for providing highly accurate and stable reference signals in response to the input video signal. Such reference signals are used, for example, in the capstan and scanner servo control systems of the VTR. Such a means is a digital input sync processor shown in FIGS. 1A and 1B and described below. Details of an edit line-up system for the VTR are shown in FIGS. 2 and 3 and also described below.

A specific example of an input synchronizing pulse processor is shown in block diagram form in FIG. 1. This particular system has four distinct modes of operation. Two of these modes are denoted as "normal," one being normal-record and the other being normal-playback. The remaining two modes of operation are denoted as edit-record and edit-playback, and are used during editing previously recorded video tape.

Referring to FIG. 1, a station composite synchronizing signal is applied to a terminal 11. Another synchronizing signal is applied to a terminal 13 which has been stripped from the composite video signal to be recorded. Both the terminals 11 and 13 are connected with a circuit block 15 which includes means for shaping the synchronizing signals in an appropriate manner at its output 17, and also provides means for automatically switching from the station synchronizing signal at the terminal 11 to the stripped synchronizing signal at the terminal 13 is the station signal is absent.

The synchronizing signal at the output line 17 is applied to a clock signal generator 19 which includes as its primary component a phase locked loop 21. The synchronizing pulses in the line 17 are applied to a phase comparison circuit 23 within the phase locked loop 21. The phase comparison circuit 23 compares the phase of "window" pulses in a feedback line 25 with that of the pulses in the input line 17. An error signal is generated in a line 27 at the output of the phase comparison circuit 23 whose voltage is proportional to the magnitude of the phase difference detected. The error signal in the line 27 is applied to a voltage controlled oscillator (VCO) 29 and thus determines the output frequency of the VCO in the line 31. A divider system 33 in the form of decimal counters clocked by the VCO output signal in the line 31 and a window pulse appears on output line 25. The VCO output in the line 31 thus becomes locked to the horizontal line pulses of the synchronizing signal in the line 17 but at a frequency that is a multiple thereof by a constant K1 that is the predetermined count of the counter within the divider system 33.

The parallel contents of divider 33 are applied to gates 34 which provide an edit line-up display reference pulse at the horizontal rate $f_h$ on line 36. This pulse which arbitrarily is made to occur three-fourths of a horizontal line from the left edge of the reproduced video picture is used for manual edit line-up as is described below. To accommodate machine delays in the VTR, the pulse is adjustable over ±0.5 microseconds.

The clock signal generator 19 additionally includes a crystal controlled oscillator 35. A lock detector 37 compares the phase of the synchronizing pulses in the line 17 with that of pulses in the feedback line 25 of the phase lock loop 21. The lock detector 37, in a preferred form, includes a flip-flop that is set by the feedback window pulse in the line 25 and is reset by a horizontal line pulse from the line 17, and thus will remain reset if the pulse remains within the window. The output pulses of the flip-flop are integrated and the output of the integrator circuit is applied to a comparator which provides an output when the integrator output exceeds a threshold level. When an unlocked condition is detected, the change in signal in the line 39 causes a switch 41 to change connection of a clock signal output line 43 from the VCO output line 31 to a line 45 that is the output of the crystal controlled oscillator 35.

For the U.S. color television system (NTSC), the constant K1 of the divider 33 is, as a specific example, equal to 500. This means that a pulse is emitted in the output line 25 of the divider 33 every 500th cycle of the VCO 29 output in the line 31. The frequency of the oscillator 29 in its output line 31 is thus 500 times the horizontal line pulse repetition rate of the input composite synchronizing signal. This oscillator frequency is about 7.875MHz. The frequency of the crystal controlled oscillator 35 is thus also set at 7.875MHz.

A frame pulse generator 47 receives a clock signal in the line 43 at a divider 49 which is a counter having a predetermined count of one half the constant K1. That is, it will count 250. An output line 51 of the divider 49 carries a pulse train having a frequency twice the horizontal line frequency ($2f_h$) of the input composite synchronizing signal. The signal in the line 51 is a clock signal which drives the dividing counter and logic circuit block 53. This counter has a predetermined count of 525 for the U.S. system.

An output line 55 carries a pulse which occurs once each field of video information. To assure that the pulse in the output line 55 is coincident with a field pulse in the input composite synchronizing signal, a field detector 57 receiving the composite sync on line 18 is connected to reset the counter within the block 53 upon occurrence of a field pulse in the input signal. Such a reset pulse merely serves to phase the counter within the block 53 and once phased, this counter is not affected by the reset pulse at the output of the field detector 57.

In the absence of proper lock-up of the clock signal generator, vertical reset action is not meaningful, since synchronous operation is not being attained in any case. If the input composite synchronizing signal is replaced by random noise, as may occur when dubbing from another VTR if it progresses beyond the point at which a signal has been recorded, then random reset action will occur if false pulses from detector 57 are allowed to reset counter 53. To prevent this, the output of lock detector 37 which appears on line 39 is also applied to field detector 57 to inhibit its output in the "not locked" condition. The absence of the field reset pulses does not impair any of the outputs of block 53; the system continues to provide a coherent set of output signals at the correct rates (within the limits of crystal oscillator frequency) although of course no longer phased to any outside references.

The counter in the block 53 is clocked two counts for each horizontal line pulse of the input synchronizing signal since two pulses for each horizontal line are generated in the line 51.

In addition to the dividing counter, the block 53 includes logic circuitry connected thereto for emitting in a line 58 a pulse one horizontal line time (1H) (two counts of the counter within the block 53) in advance of the field pulse output in the line 55. Similarly, pulses appear in the line 59 two horizontal lines (2H) (four counts of the counter in the block 53) ahead of the nonadvanced field pulse in the line 55. A switch 61 selects between the lines 57 and 59 to present an advanced field pulse output in a line 63. If a dropout compensator is used in the video processing circuits, the switch 61 is connected with the line 59 to advance the field pulse an additional horizontal line time to compensate for the one-line delay of the dropout compensator.

The advanced field pulse signal in the line 63 is applied to a digital delay system 65 for controllably delaying the advanced field pulse for over two horizontal line times, in increments of one clock-pulse intervals. The advanced field pulse after being delayed a controlled amount, as described hereinafter, appears in an output line 67 of the digital delay system 65. A switch 69 within the frame pulse generator 47 selects between the line 55 for a field pulse that is not advanced and the line 67 for the field pulse that has been conditioned by the digital delay system 65. A line 71 from the output of the switch 69 is connected to a flip-flop circuit 73 which serves to divide the field pulses applied to it as a clock source by two and provide in output lines 75 and 77 pulses at the monochrome frame rate. The pulses in the lines 75 and 77 occur at substantially the same time but, because of their different uses, are shaped quite differently and are of a different time duration. The line 75 pulses are further applied to a divide by 2 flip-flop 76 that provides the two possible phases of the 15Hz color frame rate as its outputs Q and $\overline{Q}$. The two possible color frame phases are provided because there is no way to uniquely define the color frame. As is described below, the present invention is directed to choosing the correct phase.

The purpose of switch 69 is to allow exact synchronism between the several outputs of the synchronizing pulse processor and the input synchronizing signal during the normal record mode by connecting lines 55 and 71 in this mode. Through the medium of the servo-system references the exact position of the recorded video on the tape is thus standardized. In all other modes, an adjustable timing relationship is required, and thus switch 69 connects line 71 to the output of the digital delay system at line 67.

To assure that the pulses in the lines 75 and 77 occur during the proper field pulse to produce a monochrome frame pulse, the flip-flop divider circuit 73 is reset by a pulse in a line 79 which occurs at the output of an AND gate 81. An input line 83 to the AND gate 81 is connected to the advanced field pulse output line 63. The other input of the AND gate 81 is connected by a line 85 to the output of a divider circuit 87. The divider circuit 87 emits one pulse in its output line 85 for every two pulses at its input from the line 51. Therefore, the pulses in the line 85 are set at a horizontal line rate. The AND gate 81 emits a pulse in its output line 79 whenever the horizontal line pulse in the line 85 is coincident in time with an advanced field pulse output in the line 63.

The monochrome frame-rate reset pulses in the line 77 serve to phase counter systems 89 and 91. The counter 89 has a predetermined count of 500 for the U.S. television system, for example. The counter 89 is run from the clock signal in the line 43, which is at 7.875 MHz in this example. An output line 93 of the counter 89 is a special composite wave occurring at the horizontal rate and carrying in its significant transitions timing reference for the servo and time-base-corrector systems of the VTR. The timing relationship between these significant transitions (four in number in the preferred embodiment) and their relationship to the frame-rate reset pulses of line 77 are established by selective gating within the counter system 89. These relationships remain constant with respect to each other as the timing of the frame-rate reset pulses to the input synchronizing signal is altered as described above. Stated differently, the composite waveform can be viewed as two or more pulse trains each occurring at the horizontal rate but displaced or staggered with respect to each other. In some VTR's it may be useful to output each pulse train on separate lines, however, they are combined here in a single output line 93.

Another output from counter system 89 provided at line 95 consists of pulses at twice horizontal line rate in which significant transitions also bear a constant relationship to the frame-rate reset pulses of line 77. These are applied as clock pulses to counter system 91 described below.

Counter system 91 has a predetermined count of 525 for the United States system, is clocked by line 95 described above, and reset by frame-rate reset line 77. Three field-rate outputs having a constant timing relationship to each other and to the frame-rate reset pulses are established by selective gating within counter system 91 and appear at output lines 98, 99, and 101. These are used as timing references in the several servo systems of the VTR. These frame-rate outputs on separate lines 98, 99 and 101 are analogous to the composite horizontal rate pulses appearing on line 93 from block 89.

Another servo reference signal, nominally at 42KHz, also phased by frame-rate reset line 77 is provided at output line 103 by doubler and divider system 105. This reference signal, an integral multiple of the monochrome frame rate, is used to determine the basic rotational rates of the capstan and scanner motors in the VTR.

As described above, the action of switch 69 disconnects the digital delay system during the NORMAL RECORD mode. In NORMAL PLAY mode, the advance or delay imposed is determined by the setting of switch array 133 as described hereinafter.

The advanced field pulse of line 63 sets flip-flop 111 and its output line 115 is carried via switch 119 and line 118 to the count-enable of counter 121. It will be understood, here as in other parts of this description, that unless manual switches are specifically called out, switching functions are actually performed by gating circuitry.

Counter 121 is clocked by clock line 43 and its parallel output compared against the information set into a manual switch array 133. The counter output reaches digital comparator 127 via line 125, and the switch array output reaches the comparator via switch 137 and gates 139. When the attained count equals that set into the manual switch array, the comparator produces an output pulse on line 129. This pulse forms the useful output of the digital delay system, the conditioned field pulse of line 67, to which it is connected by switch 131.

The comparator output on line 129 is also applied to the reset input of flip-flop 111. When flip-flop 111 is reset the enable input is removed from counter 121 and counting action ceases.

Dividing counter and logic system 53 provides an output pulse on line 60 which clears counter 121 once per field. This pulse occurs several lines in advance of the nonadvanced field pulse (12.5 lines in advance in the preferred embodiment). The counter is thus ready to repeat the counting sequence described above each time the advanced field pulse appears on line 63.

In EDIT PLAY mode the positions of switches 119, 131, and 137 are altered per the labels shown. In this mode the advanced field pulse of line 63 is used to trigger voltage-controlled one-shot 113. The trailing edge of the pulse from this one-shot, which appears on line 117, is now the useful output of the digital delay system: the conditioned field pulse of line 67, to which it is connected via switch 131. The duration of the pulse is controlled manually or automatically by a D.C. potential applied to one-shot 113 via control line 123.

During EDIT PLAY, a digital representation of the one-shot pulse duration is generated in counter 121 and subsequently stored in latches 132. During the one-shot output pulse which appears on line 117, counting in counter 121 is enabled via switch 119 and line 118. The duration of the one-shot pulse will thus be measured in terms of clock pulse intervals, and the binary number representing pulse duration appears on counter output lines 125 which are connected to latches 132. At the trailing edge of the one-shot pulse, the attained count will be strobed into the latches, strobe control being connected to the latches by line 117. Thus at the emergence of each conditioned field pulse on line 67, the latches outputs will represent a binary number which accurately reflects the delay introduced by one-shot 113. By manual or automatic control, this delay has been set to that required for correct edit line-up, i.e., the VTR timings are synchronized to the input video signal.

In the EDIT RECORD mode we wish to maintain this same delay. As the machine goes from EDIT PLAY to EDIT RECORD, which occurs at a predetermined time in advance of the conditioned field pulse of line 67, switches 119 and 131 revert to positions corresponding to those obtaining in the NORMAL PLAY mode. However, switch 137 remains in its "EDIT" position, and thus the delay of the digital delay system is determined by the contents of the latches 132 rather than the manual switch array 133. Since the contents of the latches 132 remain unaltered during an EDIT RECORD sequence of any length, the "remembered" required edit-line-up delay is maintained with excellent stability.

Means for securing automatic edit line-up are outlined in FIG. 2. The following description will be made in terms of a single video head, but it will be understood that this description is equally applicable to multiple-head VTRs employing appropriate head-switching means.

To secure a transition between playback and record modes in assemble or insert editing such that no excessive phase discontinuity will be experienced in subsequent playback through the edit, it is necessary that the video head and tape position (i.e., playback timing) be such that the relative phase of the signal being reproduced at the head be identical to that of the signal about to be recorded, at the head. The relative phase of these signals is commonly evaluated in terms of the timing of the leading edge of the horizontal synchronizing signal in each case. Because of inherent time delays occurring in the recording and playback electronics, we do not have direct access to this relative phase information at the head, but because these delays are invariant, we can take them into account by appropriately advancing the phase of the playback horizontal synchronizing information. Given these two signals, properly conditioned, we can now apply them to a phase comparator and produce a delay-control error signal which by means of the synchronizing pulse processor of FIG. 1 described above will adjust the head and tape position to minimize this error, thus achieving automatic edit line-up.

It is a feature of the automatic edit line-up system described that it will operate with either stripped sync or station composite sync, and because of the wide advance/delay range available it will accommodate any practical relative delay in arrival of the video to be recorded and the station snyc. It is of course assumed that these signals are synchronous, but a relative delay is often found in large systems due to differing cable lengths, processing delays, etc.

Referring to FIG. 2, the video signal in modulated form is reproduced by video head 143 and its output is conditioned by playback electronics 149 to secure demodulated-video stripped sync on line 155. This stripped sync is conditioned by off-tape sync processor 151 to secure an advance which is equal to the combined recording and playback delays; the conditioned output appearing on line 157. Processor 151 also provides and edit line-up display pulse (through a phase locked loop to average out variations in the off-tape timing) having the same advance to account for machine delays and located three-fourths of a line from the left side of the reproduced picture. An edit line-up reference is provided by synchronizing pulse processor 141 on line 92; this horizontal-rate information is phased to the horizontal component of the video signal about to be recorded. The edit line-up display reference pulse is provided on line 36. In this arrangement no adjustment in the display reference pulse position is required because the off-tape sync processor 151 has accounted for the machine delays.

The horizontal-rate signals of lines 92 and 157 described above are applied to phase comparator 153 to secure a delay-control error signal output on line 123, and this signal is applied to processor 141 when switch 124 is in the automatic position to alter the timing of the servo-reference outputs of the synchronizing pulse processor 141 in the manner described previously. This results in a change in head and tape position in a direction to minimize the error signal; this closed-loop action thus provides the desired edit line-up action as shown in FIG. 2. In the manual position the VTR operator watches a video monitor which receives the edit line-up display pulses from lines 36 and 152. These pulses appear as vertical lines. By adjusting potentiometer connected between a voltage source and ground, a $\pm 2\mu s$ range, for example, is provided in the delay control line 123 and the operator can align the vertical lines to achieve edit line-up manually.

Alternatively, as in FIG. 3, block 151 may be omitted and the stripped sync on line 155 applied directly to phase comparator 153. A delay line 159 is inserted in line 92, its delay set to reflect the combined record and playback delays. The resulting circuit functions the same as that of FIG. 2, in one case the off-tape horizontal is advanced and in the other case, the reference horizontal is delayed. The edit line-up display pulse for manual edit line-up is derived through a phase locked loop 156 and pulse generator 158. The two approaches are equivalent.

To complete the understanding of the context in which the present invention operates, details of the servo systems for controlling the capstan and scanner of the exemplary VTR are shown in FIGS. 4–13 and described below.

Figure 4:
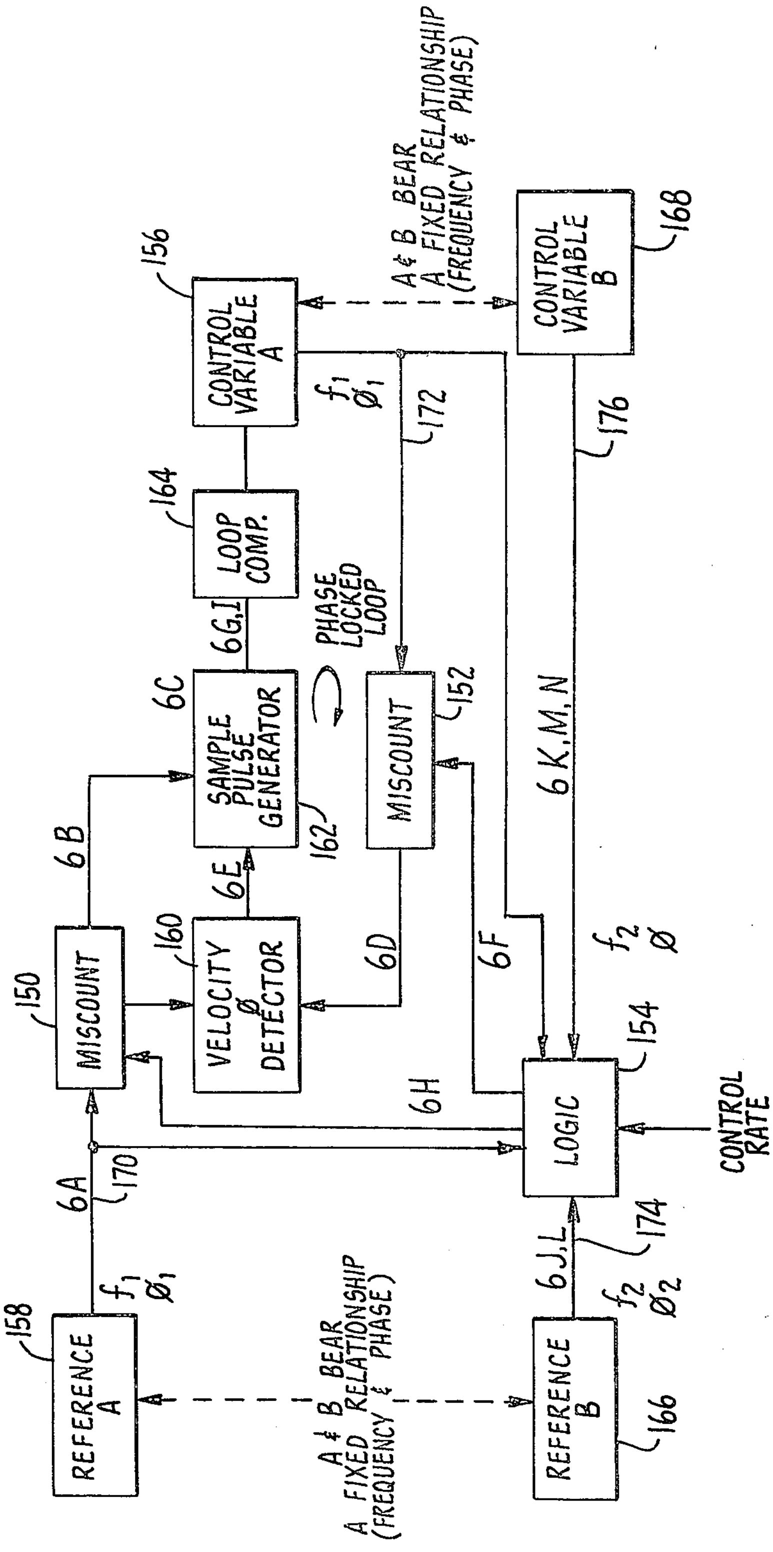
FIG. 4 is a general block diagram of the "miscount" phasing system useful in understanding the servo systems particularly adapted for use with the present invention.
Figure 5:
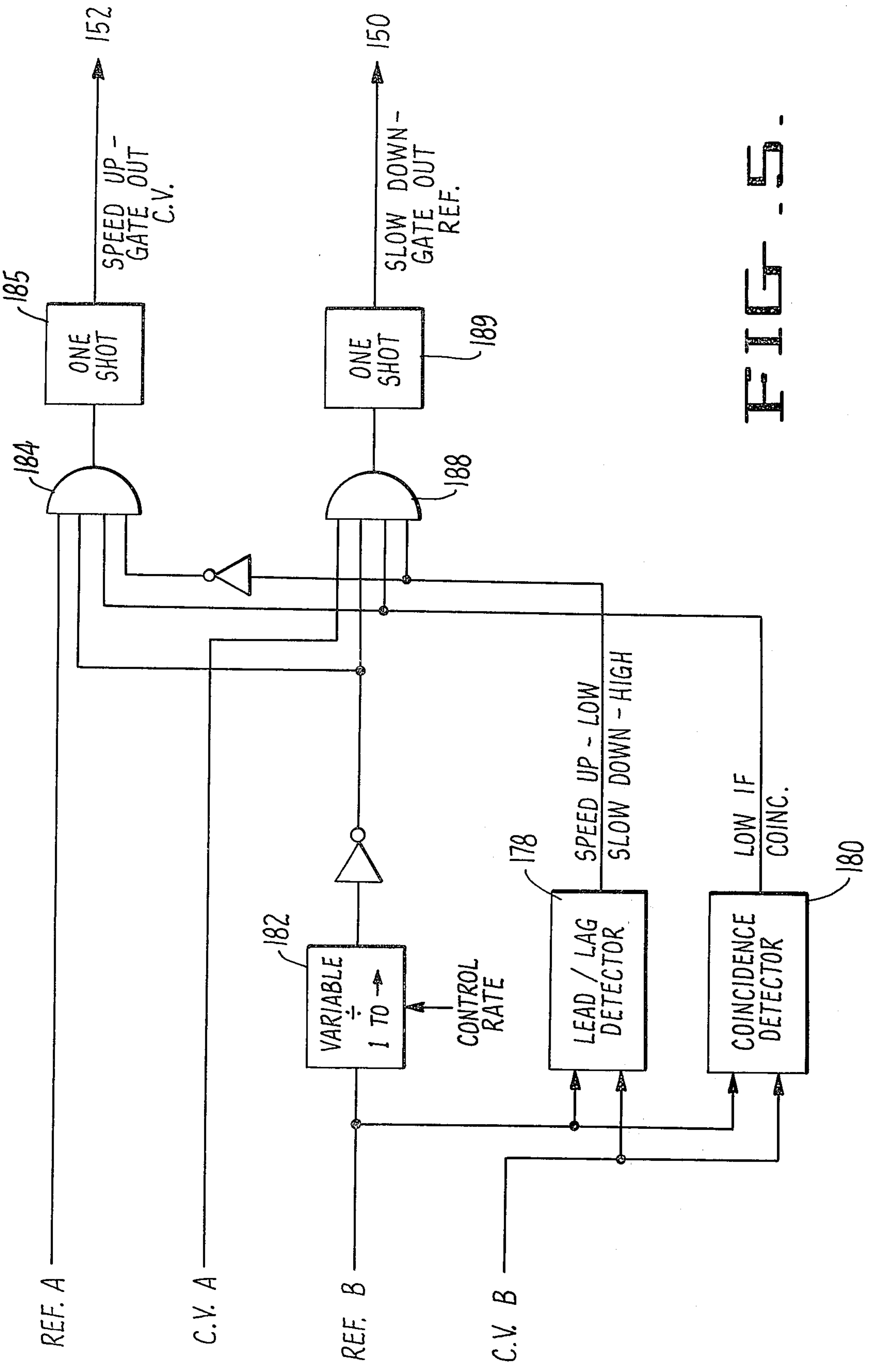
FIG. 5 is a block diagram of the logic block of FIG. 4.

FIGS. 4 and 5 show in block diagram form a circuit and method useful for bringing a control variable signal "B" into frequency and phase lock with a reference signal B where the control variable signal B bears a fixed frequency and phase relationship to a further control variable signal "A" that is in frequency and phase lock with a further reference signal A, reference signal A bearing a fixed frequency and phase relationship to reference signal B. An understanding of this general circuit approach will be helpful in subsequent description of the scanner and capstan servo loops herein.

Throughout this application, reference is made to television vertical and horizontal sync signals. In the United States and certain foreign countries, the field frequency for monochrome (black and white) is 30Hz and for NTSC color is 29.94Hz; the monochrome horizontal frequency is 15,750Hz and the color horizontal frequency is 15,734.26Hz.

Figure 6:
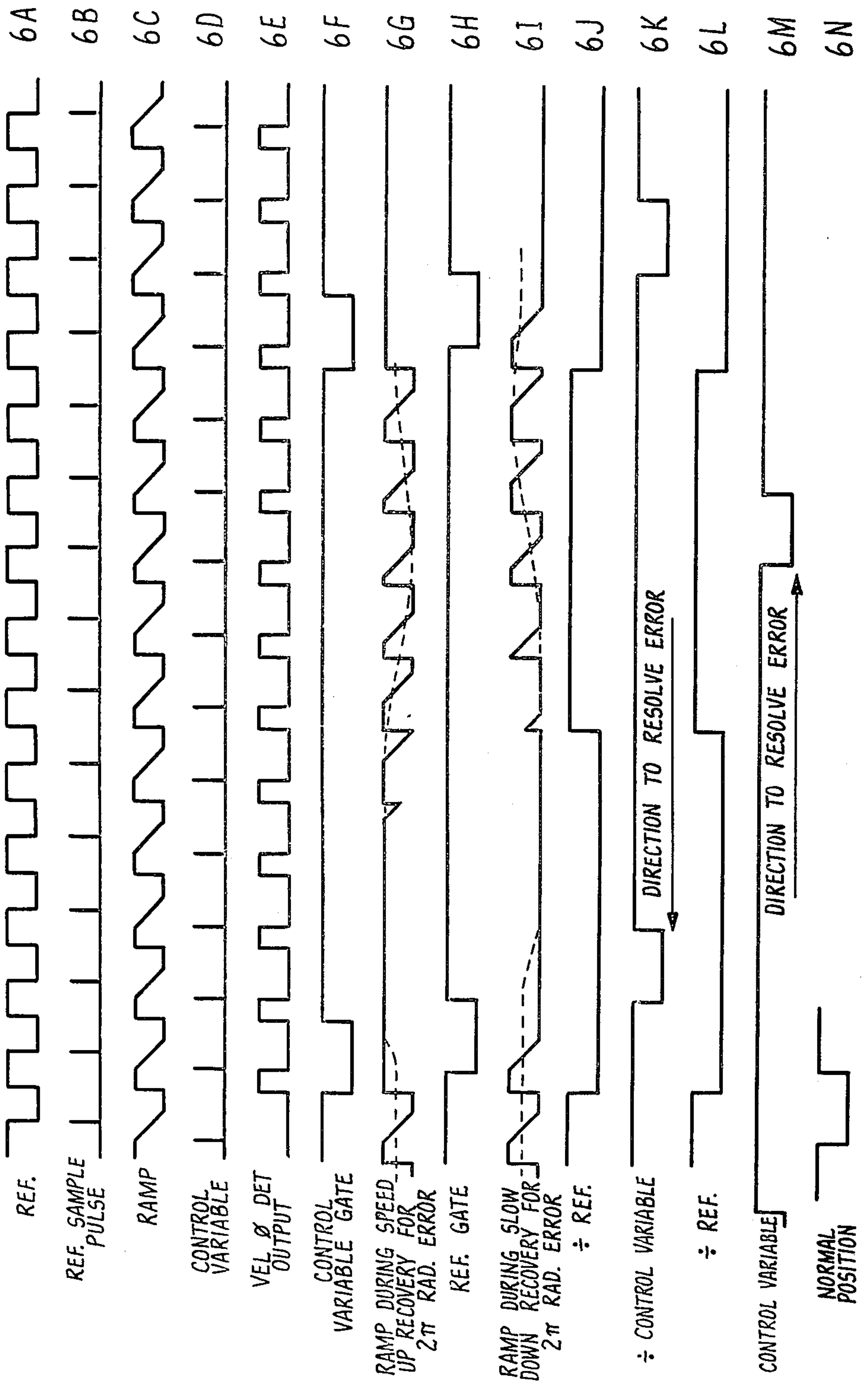
FIGS. 6A–N are a series of waveforms useful in understanding FIG. 4.
Figure 7:
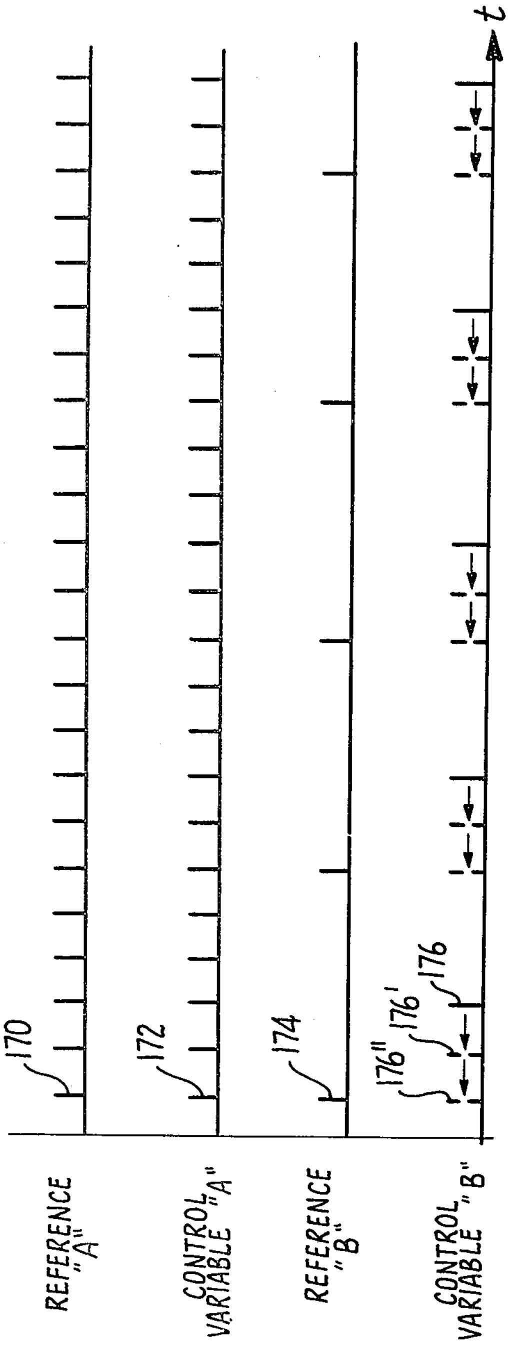
FIG. 7 is a timing diagram useful in understanding FIG. 4.

FIGS. 4 and 5 will be understood better in conjunction with the wave forms shown in FIGS. 6 and 7.

Initially, ignore miscount blocks 150, 152 and logic block 154. Assume that the input and output lines of miscount blocks 150 and 152 are connected together. Thus a portion of the circuit becomes a conventional phase locked loop that locks the control variable A (block 156) in frequency and phase lock with references A (block 158). Thus reference A and control variable A are both at frequency $F_1$, phase $\phi$.

The reference A signal (FIG. 6A) from the reference A block 158, a square wave at frequency $f_1$, phase $\phi$, is applied to one input of a velocity phase detector 160 and to a sample pulse generator 162. The control variable A signal from control variable A block 156, which is also at frequency $f_1$, phase $\phi$, when the loop is locked is applied to a second input of the velocity phase detector 160.

The velocity phase detector 160 is also known in the art as a forward/backward or up/down counter. It provides one of three outputs: high if the reference pulse rate (frequency) is higher than the control variable pulse rate; low if the reference pulse rate is lower; and a toggle (FIG. 6E) (alternate high and low) output if the rates are the same. The toggling duty cycle depends on the phase of the reference and control variable: one causes the velocity phase detector to rise and the other causes it to fall.

The velocity phase detector 160 output drives a ramp generator contained in the sample pulse generator 162. A ramp (FIG. 6C) is initiated by the rising part of each detector output pulse, this being coincident with the control variable edge (FIG. 6E). The ramp is sampled by a pulse (FIG. 6B) generated by the trailing edge of the reference A pulse (FIG. 6A). The ramp (FIG. 6C) is stopped during the sample so that a DC level is produced having no carrier frequency component. The nominal frequency of the control variable A: and the reference signal A is the carrier frequency of the loop. Conventional loop compensation in block 164 is provided to achieve the desired loop bandwidth, damping, etc.

Now suppose there is a third signal, reference B, provided by block 166, directly related to the reference A signal (as by a divider, for example: reference B at a lower frequency) and there is also a fourth signal, control variable B, provided by block 168, that is directly related to control variable A (as by a divider, for example, control variable B at a lower frequency). It follows that the reference B signal (from block 166) and the control variable B signal (from block 168) are in frequency lock if the phase locked loop is in lock, but they are not necessarily in phase lock since there are numerous positions at which the higher frequency signals (reference A and control variable A) can be in phase lock without the lower frequency signals (reference B, control variable B) being in phase lock. This effect is shown in FIG. 7 where the reference A pulses 170 are in frequency and phase lock with the control variable A pulses 172. Likewise, the reference B pulses 174 are in frequency lock (although at a lower frequency) and phase lock with the reference A pulses 170. Pulses 170 and 174 are directly related to each other and move together. On the other hand, the control variable B pulses 176 are also in frequency lock (although at a lower frequency) and phase lock with the control variable A pulses 172.

However, it will be noted that while the reference B pulses 174 and control variable B pulses 176 are in frequency lock they are not in phase lock in this example. There are five phases of pulses 170 and 172 that the pulses 174 and 176 can lock onto, hence, only by pure chance will pulses 174 and 176 be in phase lock with each other. The ultimate purpose of the circuit, therefore, is to phase lock control variable B (pulses 176) to reference B (pulses 174). As will be explained, this is accomplished by "ratcheting" pulses 172 relative to pulses 170 in the main phase locked loop until the pulses 176 (which follow pulses 172) have "stepped" over into phase lock with pulses 174. Thus, in the example of FIG. 6, the pulses 176 step incrementally to position 176′ and to 176″ where phase lock is achieved.

In order to achieve the required correction, the control variable A must either be speeded up or slowed down for a short period of time. In accordance with the invention, the frequency of the control variable A is changed in incremental steps which results in a movement of $2\pi$ radians phase (of the loop carrier frequency). This is done by sequentially removing one or more pulses (i.e., "miscounting") from the control variable A or from the reference A signals that are applied to the velocity phase detector 160 until the reference B and control variable B signals are in phase lock. As a pulse is removed, the phase locked loop goes out of lock and a predictable amount of time is required for the loop to relock in frequency and then in phase. This time is less than the time between reference B pulses and the frequency of reference B must be smaller than about one-fifth to one-tenth of the reference A frequency. Pulses may be removed at any desired rate (the control rate) up to a rate equal to the frequency of reference B. If desired, a pulse could be removed only once a day (or month, etc.), however, this would make the time for resolving the error rather long. After the phase locked loop relocks following a pulse removal, the logic circuit 154 looks at reference B and control variable B to see if they are in phase lock. If not, it again removes a pulse. If the shortest direction for correction requires increasing the control variable A frequency, instead of slowing it down, then a pulse is removed inside the loop by miscount block 152. The reference A pulses and the control variable B pulses are also applied to logic block 154. It will be noted that the reference signals are used as a time reference to gate out the control variable pulses and vice-versa.

Referring now to the operation of FIG. 4 taken with the waveforms of FIG. 6 and the specification, the velocity phase detector 160 toggles when the two input signals are at the same frequency. Their relative phase controls the toggle duty cycle. A ramp is initiated by the falling part of each detector output pulse. Thus if the signals are not at the same frequency, as when the loop is out of frequency lock, no ramp is generated. When the loop is in the frequency lock, the falling part of the detector output pulse corresponds to the control variable pulse. The ramp is sampled by a pulse generated from the trailing edge of the reference A pulse. When control variable A pulses are gated out by the gate pulses of FIG. 6F, the loop goes out of frequency and phase lock and the loop attempts to speed up in order to re-establish lock. Thus, in FIG. 6G the ramps are stopped since there is no frequency lock and the detector 160 has stopped toggling. The dashed lines in FIGS. 6G and 6I show the sampling level. Since the sampling level rises, the control variable A increases frequency. As the control variable A increases speed briefly, it achieves frequency lock. Note that in FIG. 6G the ramp again begins to occur. However, the duty cycle is different until phase lock is achieved shortly before the next reference B pulse.

A similar effect can be seen in FIG. 6I for the case where the pulses in FIG. 6H gate out reference A pulses and thereby cause the loop to briefly slow down to achieve frequency lock and then phase lock.

FIG. 6N shows the phase locked position of control variable B which straddles the negative going edge of reference B (FIG. 6J). In FIG. 6K, control variable is late and must be advanced to resolve the error. In FIG. 6M the control variable is early and must be retarded to resolve the error.

Logic 154 receives the reference B signal on line 174 (FIGS. 6J, L) and the control variable B signal on line 176 (FIGS. 6K, M, N). Logic 154 looks at the two signals to see if they are in phase lock and if they are not it determines the shortest direction for correction, i.e., by either slowing down or speeding up control variable A (FIGS. 6J, I, L, M). A speed up of control variable A is achieved by gating out a control variable A pulse inside the phase locked loop. It will be noted that the reference A and control variable A pulses are interlaced (FIGS. 6A, 6D). Thus it is convenient to use subsequent occurrences of one for gating out the other and vice-versa. The control variable gate pulse leading edge is coincident with the edge of the reference A pulse (FIGS. 6A, 6B) and the gate pulse has a duration substantially equal to the nominal period of reference A and control variable A thus assuring that one control variable A pulse will be gated out.

A slow down of control variable A is achieved by gating out a reference A pulse applied to the phase locked loop. The reference gate pulse leading edge is coincident with the control variable A pulse (FIGS. 6D, 6H).

The waveforms in FIG. 6 show a pulse being gated out at the rate of reference B (Note FIGS. 6F, H, J and L). The reference B rate is the maximum rate at which pulses may be removed. This is due to the time required for the phase locked loop to relock for the case where the B frequency is smaller than about one-fifth to one-tenth of the A frequency. However, the pulses could be removed less frequently.

Referring to the FIG. 5, an exemplary form of logic 154 is shown. Reference B and control variable B are looked at in a lead/lag detector 178, which decides which direction is shortest to resolve the error. A coincidence detector 180 determines if reference B and control variable B are in or out of phase lock. A variable divider 182 receives reference B; if the divider is set to divide by 1, then the rate at which pulses are gated out are the rate of reference B. By increasing the division the rate can be slowed to any arbitrary rate (once a day or month, if desired).

If reference B and control variable B are out of phase lock and shortest direction for resolving the error is to speed up control variable A, then the lead/lag detector output 178 is low and the coincidence detector 180 output is high. In that case only the upper AND gate 184 has a high output which starts a one-shot 186 having the desired gate pulse width output to block 152 for removing a control variable A pulse, thereby speeding up control variable A. In a similar manner for the opposite condition the lower AND gate 188 has a high output to start one-shot 189 having the desired gate pulse width output to block 150 for removing a reference A pulse, thereby slowing down control variable A.

As explained further hereinafter, one application of the circuit of FIG. 4 is in a video tape recorder. Reference A can be the horizontal sync reference signals and reference B can be the vertical sync reference signals. The control variable A, which can be a video tape scanner carrying the video playback heads can be in phase lock with the reference horizontal signals and yet the scanner might not be in phase lock with the reference vertical. In other words, the problem is to orient the video heads so that they are in a desired position when the reference vertical occurs. In effect, phase locking to the horizontal reference can get the scanner to the correct speed, but its relative position with respect to reference vertical can take many positions. By using the miscount or pulse dropping technique of the circuit of FIG. 4, the scanner takes discrete steps until it is locked with the reference vertical.

Figure 8:
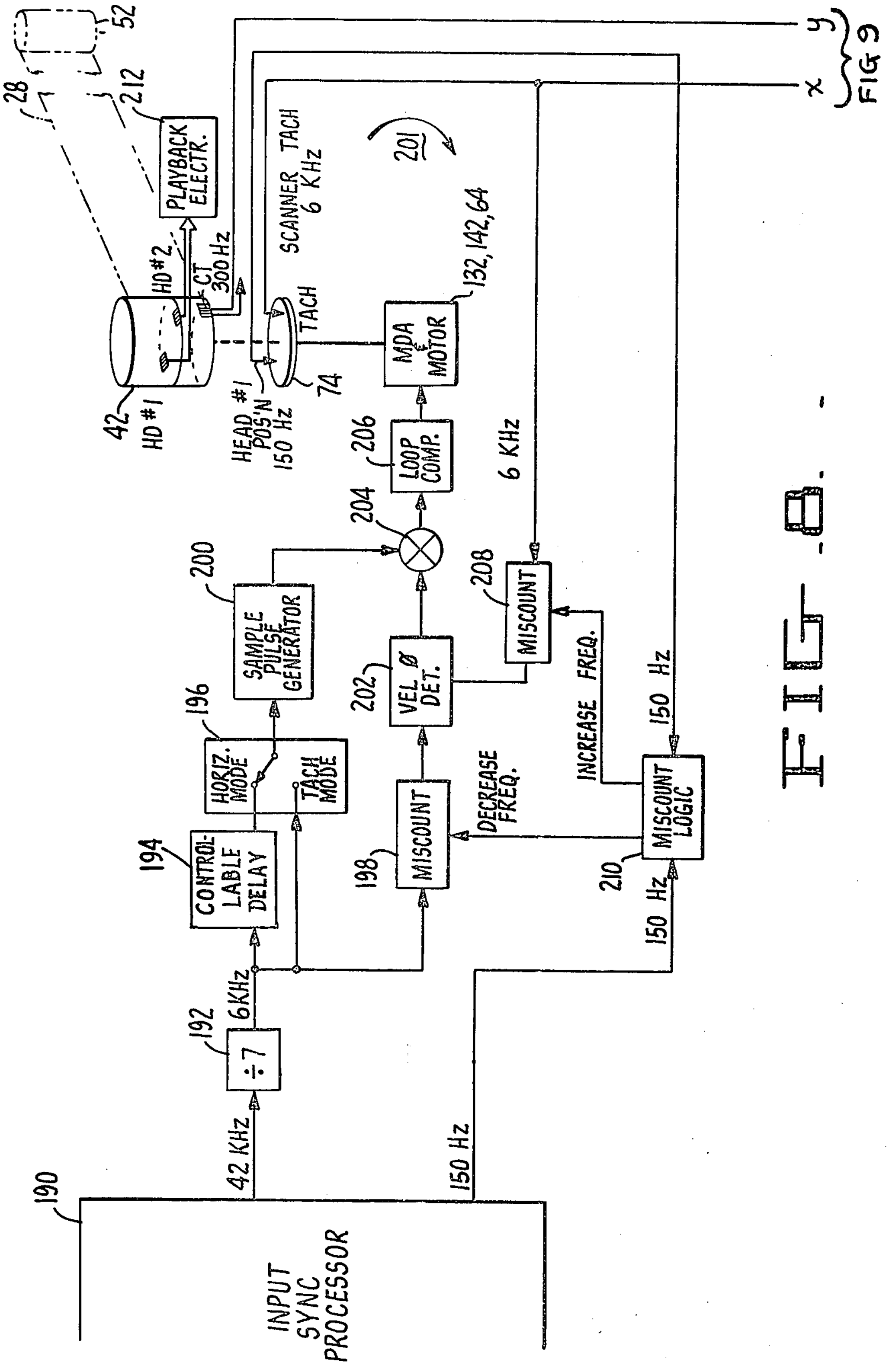
FIG. 8 is a block diagram of a scanner servo system of a video tape recorder particularly adapted for use with the present invention.
Figure 9:
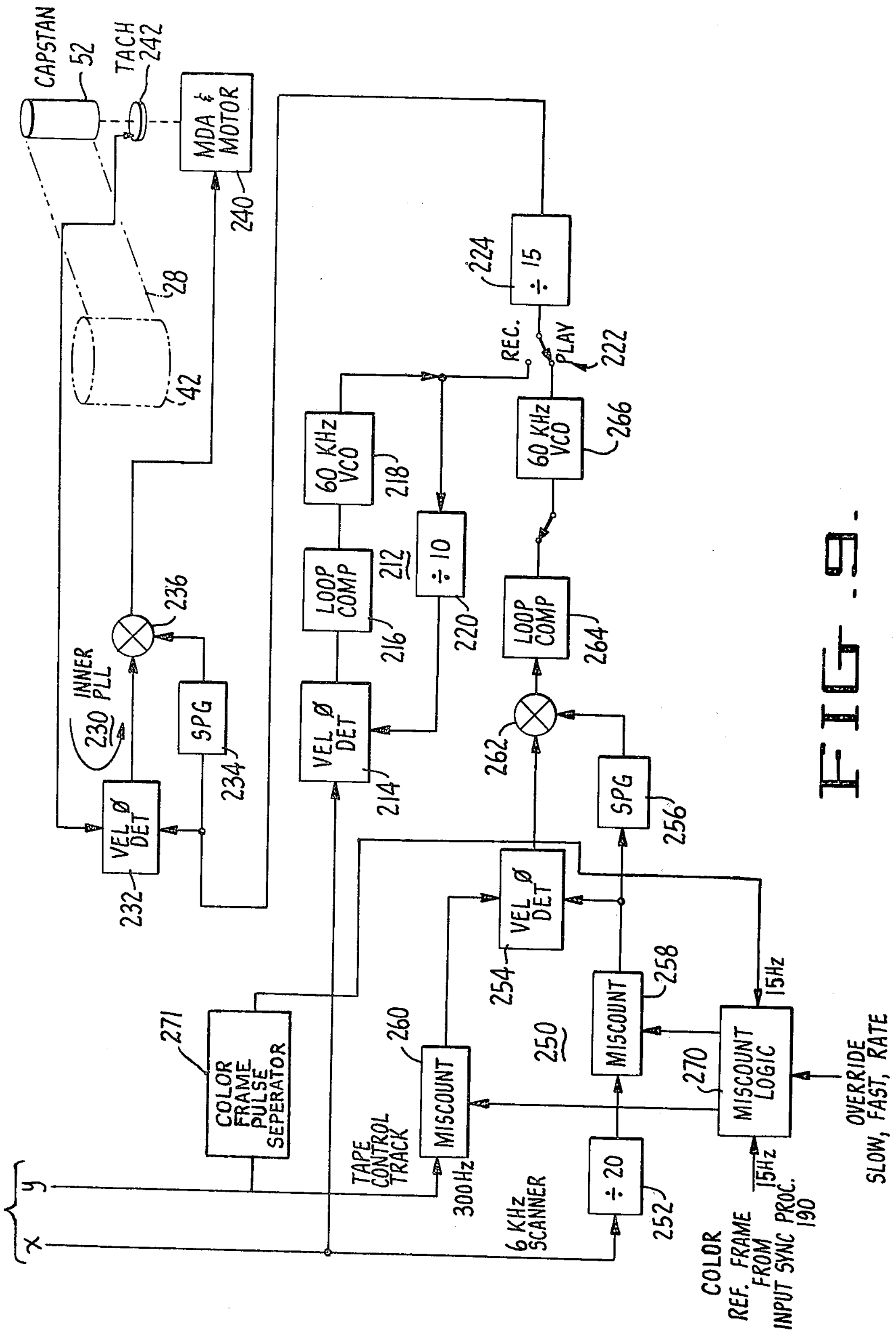
FIG. 9 is a block diagram of a capstan servo system of a video tape recorder particularly adapted for use with the present invention.
Figure 10:
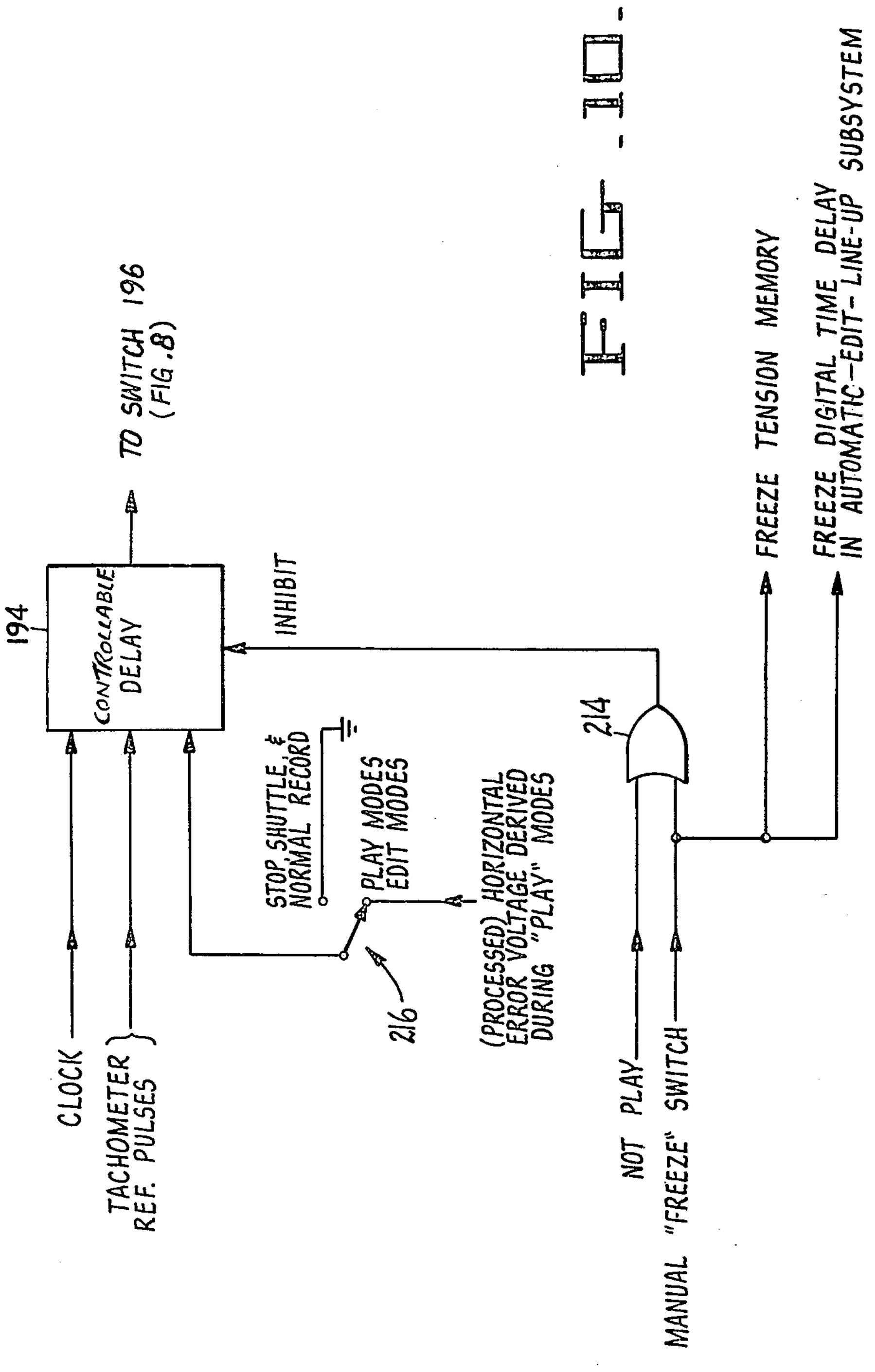
FIG. 10 is a block diagram of one embodiment of the controllable delay of FIG. 8.

Referring now to FIGS. 8 and 9 wherein a block diagram of the scanner and servo systems of a video tape recorder are shown. It will be seen that the miscount phasing system of FIG. 4 forms a portion of the system of FIGS. 8 and 9.

Before describing FIGS. 8 and 9 in detail, it will aid the understanding of the circuit to briefly explain the intended function of the circuit. Generally speaking, in broadcast studio use it is desirable to maintain the video tape recorder in frequency and phase lock with the studio reference vertical and horizontal signals during both record snd playback so that switching between the recorder and other sources may be made without loss of synchronism. Thus, the scanner carrying the video heads is usually kept in frequency and phase lock with the studio reference signals. In recording, the capstan is in turn frequency and phase locked to the scanner. The scanner drum has a fixed head which provides a control track signal recorded on the tape for use in duplicating the record conditions during playback by compensating for slightly varying dimensional tolerances in the capstan and scanner when the tape is played on a different machine from that on which the recordinng is made. Also in record, the video head "2" is oriented so that the reference frame pulse is recorded in a predetermined recording track area.

In playback, the scanner is also locked to the studio reference signals. The capstan is brought to a speed so that the longitudinal tape speed is substantially identical to the speed at which the tape was recorded by comparing the control track signal to the scanner speed. The scanner is incrementally rotated until the video head 2 is oriented correctly with the reference frame pulse and the capstan moves the tape incrementally so that the tape vertical and reference vertical are nearly in phase lock. The scanner is then rotated incrementally to resolve any remaining phase error between references and tape vertical. Then, in the fully synchronous mode, the tape horizontal and reference horizontal are resolved.

In edit-playback, the VTR is frequency and phase locked to an input signal which is to be edited into the existing recorded material. As explained below, by means of the input sync processor 190, the VTR is maintained in lock with the input signal during edit-record so that the resulting-on-tape signal comprising previously recorded and newly recorded material has no frequency or phase discontinuities.

Figure 1A:
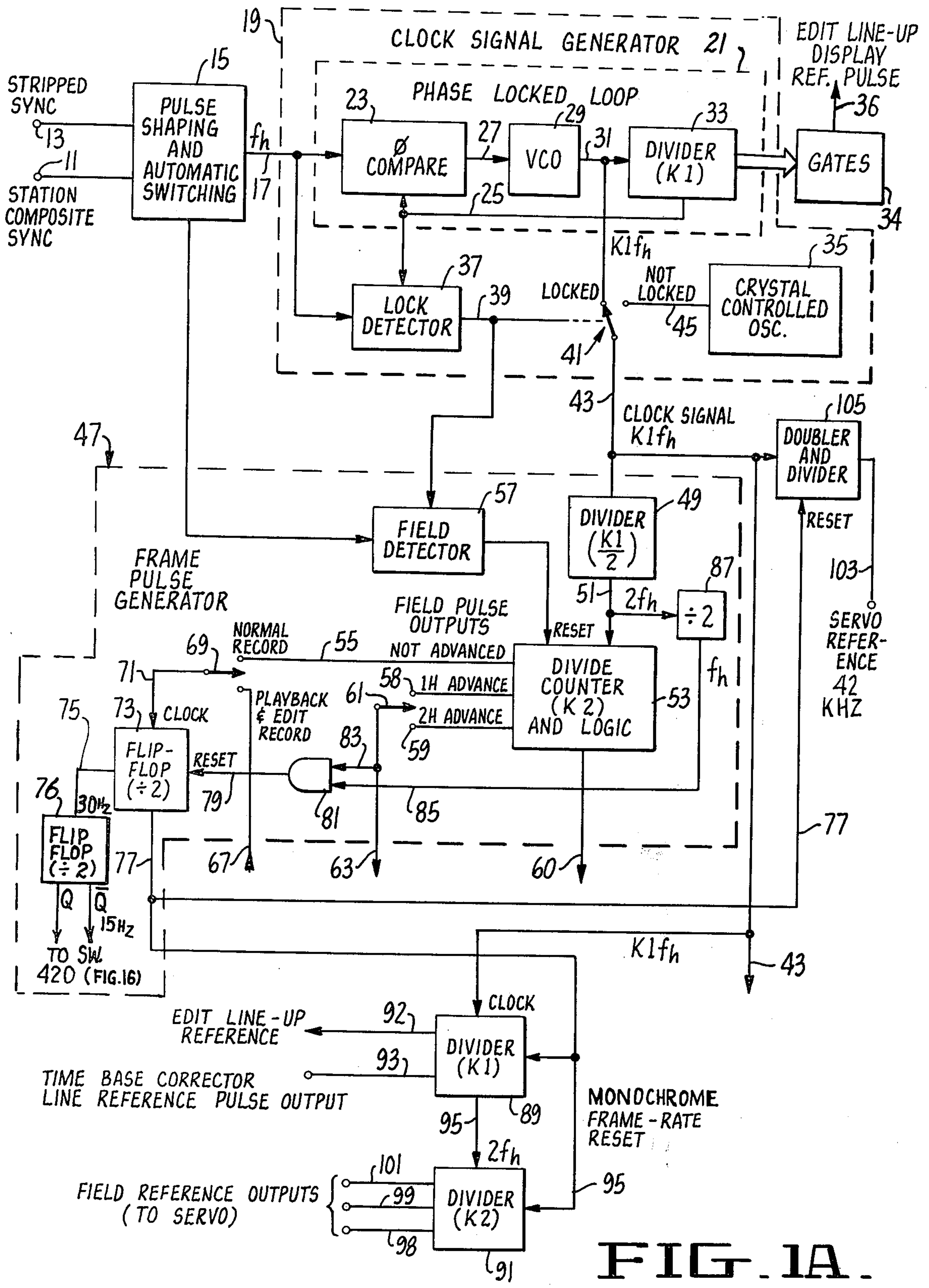
FIG. 1 is a system block/diagram of an input synchronizing signal processor particularly adapted for use with the present invention.
Figure 1B:
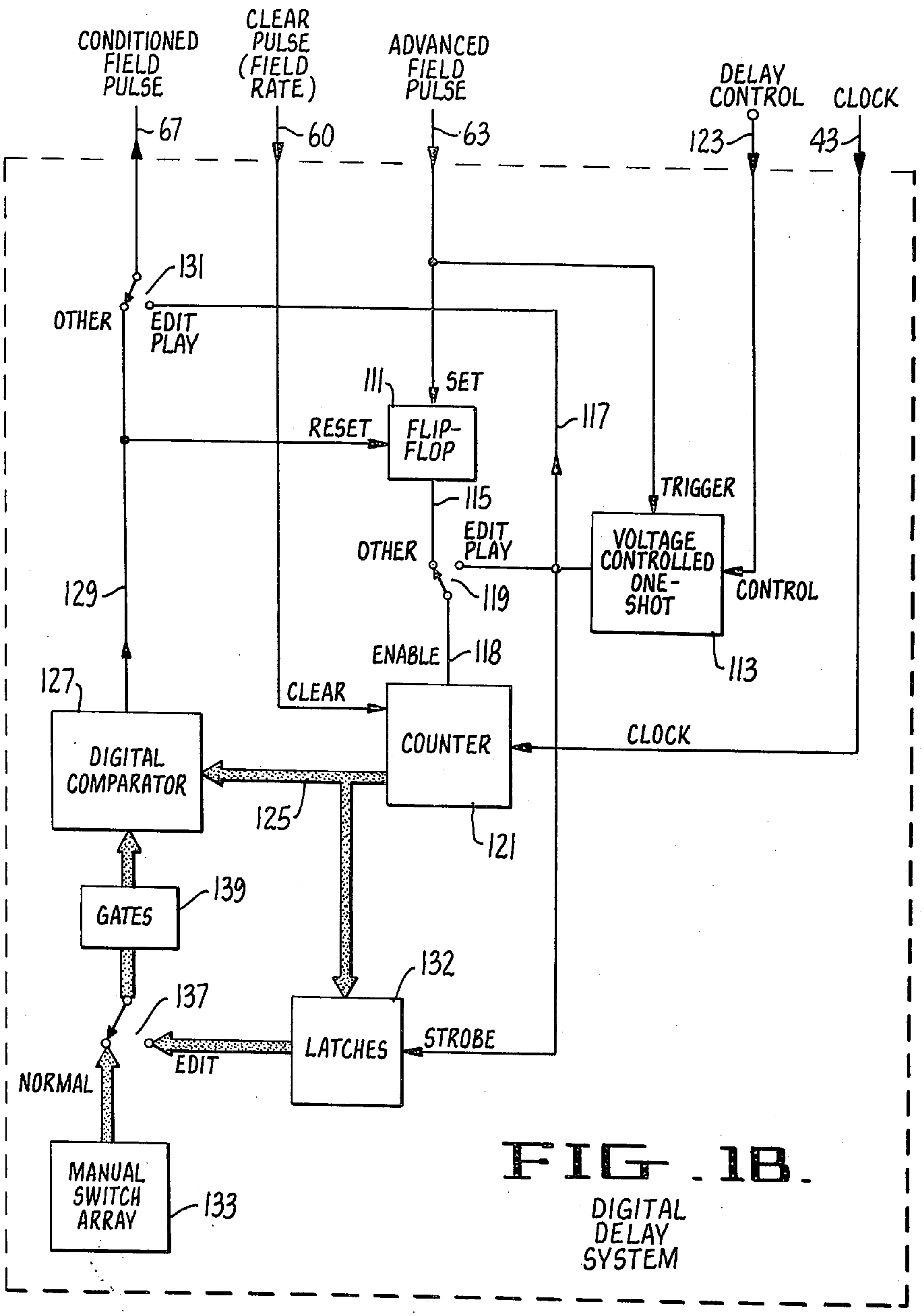

As shown in FIG. 8, an input sync processor 190 shown in FIGS. 1A and 1B which is the subject of a copending application of Bert H. Dann and Nikola Vidovic, entitled Synchronizing Pulse Processor for a Video Tape Recorder, filed Sept. 1, 1972, Ser. No. 285,919, provides a set of reference signals at the horizontal sync rate, at 42 KHz, and at 150 Hz. These signals may be derived from the studio horizontal and vertical sync signals, but may be advanced in the sync processor in order to account for delays in the recorder circuitry. In order to provide a full understanding of the present invention, details of the input sync processor 190 are disclosed below.

First, referring to the circuitry for frequency and phase locking the scanner to the sync processor 190, the 42 KHz signal is applied to a divide by 7 counter 192 to provide a 6 KHz signal. The 6 KHz signal is applied to a controllable delay sircuit 194 that has its output connected to one input of a single pole double throw switch 196 that places the circuit in the horizontal mode (fully synchonous) or tach mode (VTR only locked to vertical). The details of the controllable delay 194 are shown in FIGS. 10–13. The 6 KHz signal is also applied to the other half of switch 196 and to the input of miscount gate 198.

Switch 196 has its output connected to one input of sample pulse generator 200. Miscount gate 198 has its output connected to one input of velocity phase detector 202. The output of detector 202 is applied to a conventional phase detector 204. A phase locked loop 201 is formed including the velocity phase detector 202, phase detector 204, a conventional loop compensating network 206, the scanner motor drive amplifiers 132, 142 and motor 64, the scanner tachometer 6 KHz signal and a further miscount gate 208. Detector 202, compensation network 206, and miscount gate 208 function as in FIG. 4.

Assume initially that switch 196 is in the tach mode position and miscount gates 198 and 208 provide direct connections between their inputs and outputs, then the phase lock loop will lock the 6 KHz scanner tach signal to the divided down 6 KHz reference signal thereby frequency and phase locking the scanner rotation to the reference signal.

In order to orient head 2 on the scanner relative to the reference frame the 150 Hz head "1" pulse is compared in miscount logic block 210 to a 150 Hz related to the reference frame from the processor 190. This operation is comparable to the phasing of the control variable B in FIG. 4. Depending on the direction of error a gating signal is applied either to miscount gate 198 to remove a pulse from the signals applied to the phase lock loop, thereby decreasing the loop frequency momentarily, or to miscount gate 208 to remove a pulse from the signals within the phase lock loop, thereby increasing the loop frequency momentarily.

In the record mode (edit and normal) the 6 KHz scanner tachomater signal is applied to a phase locked loop 212 that provides a 60 KHz output signal. Loop 212 includes a velocity phase detector 214, a loop compensating network 216, a 60 KHz VCO 218, and a divide by ten counter 220. The VCO 218 provides a 60 KHz signal phase locked to the 6 KHz scanner tachometer signal to one terminal of a single pole double throw switch 222 which, in the record mode, is connected to a divide by 15 divider 224 which provides a 4 KHz output signal to a further phase locked loop 230 that includes the capstan motor drive. Loop 230 receives the signal from switch 228 at a velocity phase detector 232 and a sampling pulse gate 234. The detector 232 output and the gate 234 output are applied to inputs of phase comparator 236. A tachometer disc 242 mounted on the capstan drive shaft provides 1,500 Hz pulses at normal running speed. The tach signal is applied to the other input of the detector 232.

In the playback mode, switch 222 is disconnected from loop 212 so that the capstan is not directly locked to the scanner. This is significant in obtaining proper playback since any mechanical differences between the recorder on which the tape is made and on which it is played back must be taken into account.

The 6 KHz scanner tach signal and the 300 Hz tape control track signal are compared in a phase locked loop portion 250. The 6 KHz signal is applied to a divide by 20 counter 252 to provide a 300 KHz signal which is connected to an input of velocity phase detector 254 and sample pulse gate 256 through miscount gate 258. The 300 Hz control track signal is applied to the other input of detector 254 through miscount gate 260. The gate 256 and detector 254 outputs are applied to phase comparator 262, the output of which is applied to loop compensation network 264. A 60 KHz VCO 266 either receives the network 264 output or an auto phasing signal on line 268. The loop of which portion 250 forms a part is completed by connections to loop 230, the capstan 52 and the tape 28.

In order to "frame" the capstan, the miscount logic block 270 compares the 15 Hz reference color frame signal from processor 190 with the 15 Hz tape color frame signal separated from the tape control track signal by color frame pulse separator 271. The 15 Hz reference color frame from processor 190 is one of the two possible phases and is chosen by the circuitry of the present invention described below. The 300 Hz control track signal contains distinctive pulses at the 15 Hz color frame rate that are separable by conventional pulse separator techniques. In a similar manner as described above in connection with other loops, logic 270 controls miscount gates 258 and 260 to cause the tape to move incrementally until the tape color frame and reference color frame signals are in phase lock. However, due to slight mechanical variations this phase locking does not typically result in a perfect phase lock, but rather gets head 2 on the correct tape video track.

Typically such lock results in a horizontal error of less than one-half line. To resolve the remaining horizontal error, switch 196 is connected to the horizontal mode position so that the 6 KHz signals from divider 192 may be shifted slightly by controllable delay 194.

Details of controllable delay 194 are shown in FIGS. 10-13. Although shown, for simplicity, in FIG. 8 as receiving only the 6 KHz tachometer reference pulse input, the delay 194 receives four inputs: a clock signal, tachometer reference pulses, an error voltage and an inhibit signal. The tachometer reference signal is nominally at the scanner tachometer 74 signal frequency, however the phase of the reference tachometer signal is not sufficiently accurate under certain conditions and hence, in play (reproduction of previously recorded material) and edit (inserting new material among previously recorded material or recording consecutive segments of new material) modes of VTR operation it is necessary to provide a fine adjustment of the reference tachometer signal phase in order that the horizontal sync pulse timing of the scanner servo is within tolerable limits. Thus, an error voltage derived by comparing the phase of the reproduced horizontal pulses to the phase of a reference signal is applied to controllable delay 194 for shifting the phase of the tachometer signal by an amount necessary to resolve the horizontal phase error. Circuits for generating such a horizontal error voltage are well known in the art. Thus, there is a further phase locked loop (not shown) receiving the reproduced horizontal pulses and the horizontal reference pulses from the input sync processor of FIGS. 1A and 1B. In stop, shuttle and normal record modes there is no reproduced signal, hence the error signal is made zero by moving switch 216 to a ground reference.

In edit playback (i.e., previously recorded material is being reproduced and is to have a segment or consecutive segments of new material recorded) the horizontal error signal is applied to controllable delay 194 and the reference tachometer signal is delayed accordingly so that the reproduced horizontal signal has negligible timing error with respect to the reference horizontal signal. In order to provide the same timing for the new material to be recorded it is necessary that the scanner rotational phase remain unchanged during the edit record sequence. Thus, when the tape is later reproduced there should be no timing change between the earlier and later recorded sequences. To hold the same phase of scanner 42, the inhibit input to delay 194 "freezes" the delay at the value established during edit playback. When the operator switches the VTR operating mode from edit playback to edit record the "not play" input to OR-gate 214 goes high thus applying the inhibit signal to delay 194.

Because the VTR reverts to a horizontal-lock mode (i.e. generates the horizontal error voltage by comparing off-tape horizontal pulses to the reference horizontal pulses for phasing the scanner to provide negligible timing error between the pulses) each time the VTR goes from edit-record to edit-play, there is a possible problem if the operator desires to record a series of short inserts following one another closely in time. The time between insert edit-record sequences must be long enough that the horizontal error will be fully stabilized at the correct value for minimum static timing error.

To circumvent any chance of not achieving horizontal lock up rapidly enough to permit the next edit record sequence, a manual "freeze" is provided, for example, as a second input to OR-gate 214. After operating the machine in "edit-play" long enough to establish the error voltage, the operator operates the manual freeze control which causes the error voltage developed during edit play to be held indefinitely. He is then free to make edit record inserts as rapidly as desired. Assuming the tape remains on the same VTR machine and no large environmental changes occur, the frozen error signal should be adequate for an editing session of practical length.

In addition the same manual freeze control can be used to freeze the output of the tension-memory system and, if used, the digital time delay of the automatic-edit-line-up subsystem of FIGS. 2 and 3. Freezing the digital time delay requires, in FIGS. 1B, placing switch 137 in edit and switches 119 and 131 in "other."

Figure 11:
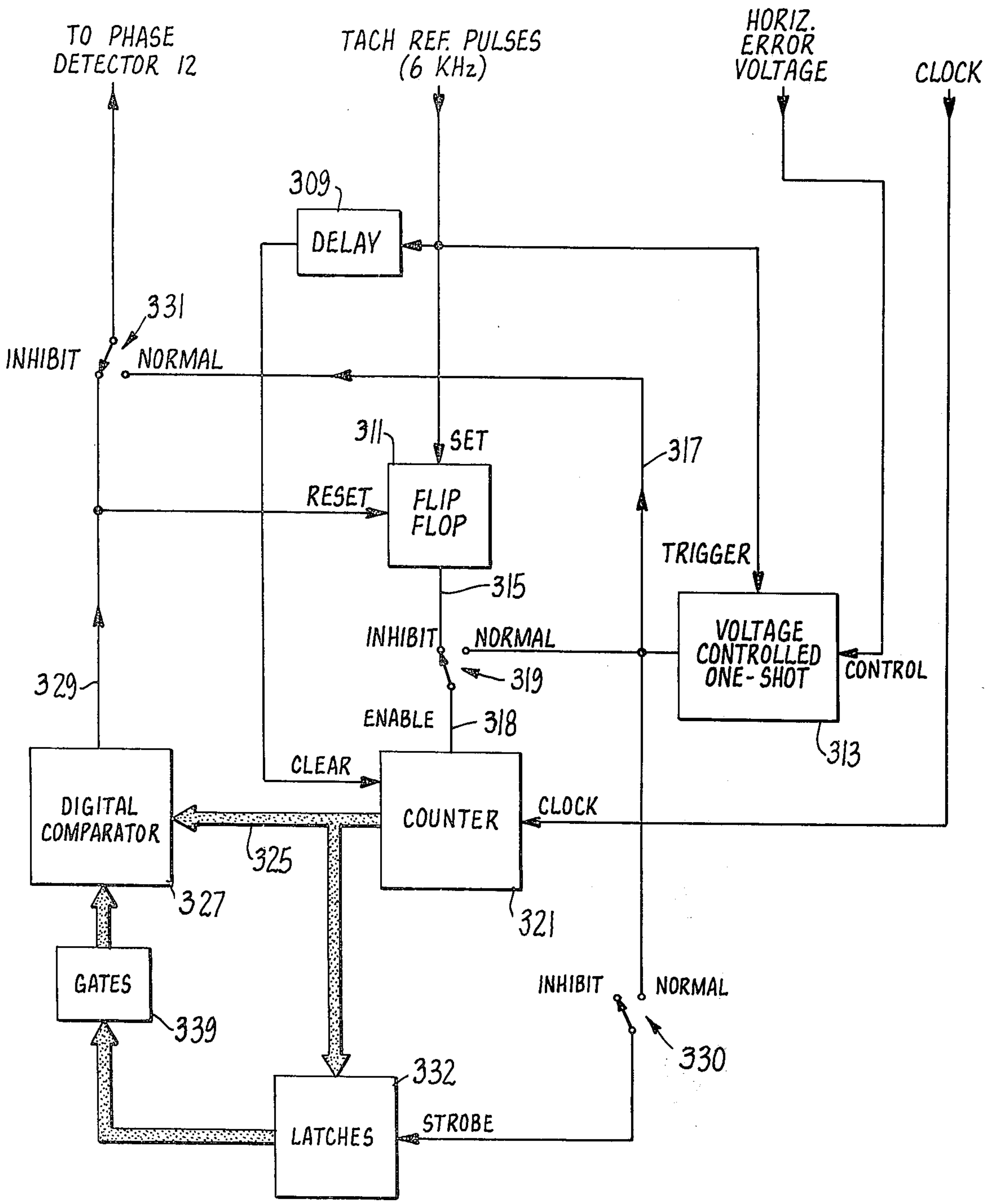
FIG. 11 is a block diagram of the digital delay portion of FIG. 10.

Digital delay 194, shown in greater detail in FIG. 11, has two modes of operataion: normal and inhibit. In its normal mode of operation, the error voltage input continuously controls the phase of the tachometer reference pulses and continuously updates a counter holding the phase delay at each clock pulse; in its inhibit mode, the last counter value is held and is used to hold the tachometer reference phase fixed. The inhibit input controls switches 319 and 331 in a gating arrangement, for example.

Thus, in the normal mode, the tachometer reference pulses at 6 KHz, for example, trigger a voltage controlled one-shot which is controlled by the error voltage input. The trailing edge of the pulse from one-shot 313 is now the useful output of delay 194 and is applied to phase detector 312 through switch 331.

At the same time, a digital representation of each one-shot pulse duration is generated in counter 321 and subsequently stored in latches 332. During the one-shot output pulse which appears on the output to sample pulse gate 200, counting in counter 321 is enabled via switch 319 and 318. The duration of the one-shot pulse will thus be measured in terms of clockpulse intervals, and the binary number representing pulse duration appears on counter output lines 325 which are connected to latches 332. At the trailing edge of the one-shot pulse, the attained count will be strobed into the latches, strobe control being connected to the latches by line 317. Thus at the emergence of each delayed reference tachometer pulse, the latches 332 outputs will represent a binary number which accurately reflects the delay introduced by one-shot 113.

The clock rate can be 7,850 KHz, for example. Counter 321 is cleared by a tachometer reference pulse delayed in block 309 by a time of proper length so that the clearing pulse occurs just prior to the next tachometer reference pulse.

In the EDIT RECORD mode we wish to maintain the same delay. As the machines go from EDIT PLAY to EDIT RECORD, switches 319 and 331 revert to the inhibit positions. Each tachometer reference pulse sets flip flop 115 which enables counter 318 via switch 319 and line 318. Counter 321 is clocked and its parallel output compared against the stored delay information set in latches 332. The counter output reaches the comparator 327 via line 325 and the latches 332 output reaches the comparator via gates 339. When the attained count in counter 321 equals that stored in latches 332, the comparator produces the properly delayed tachometer reference output pulse on line 329 which is applied to sample pulse gate 200 through switch 331. The output pulse on line 329 resets flip flop 311. During the inhibit mode the strobe input to latches 332 is opened by switch 330. Thus, the delay of the digital delay system is determined by the contents of the latches 332 rather than the voltage controlled one-shot 313. Since the contents of the latches 332 remain unaltered during an EDIT RECORD sequence of any length, the frozen tachometer reference pulse delay is maintained with excellent stability.

Figure 12:
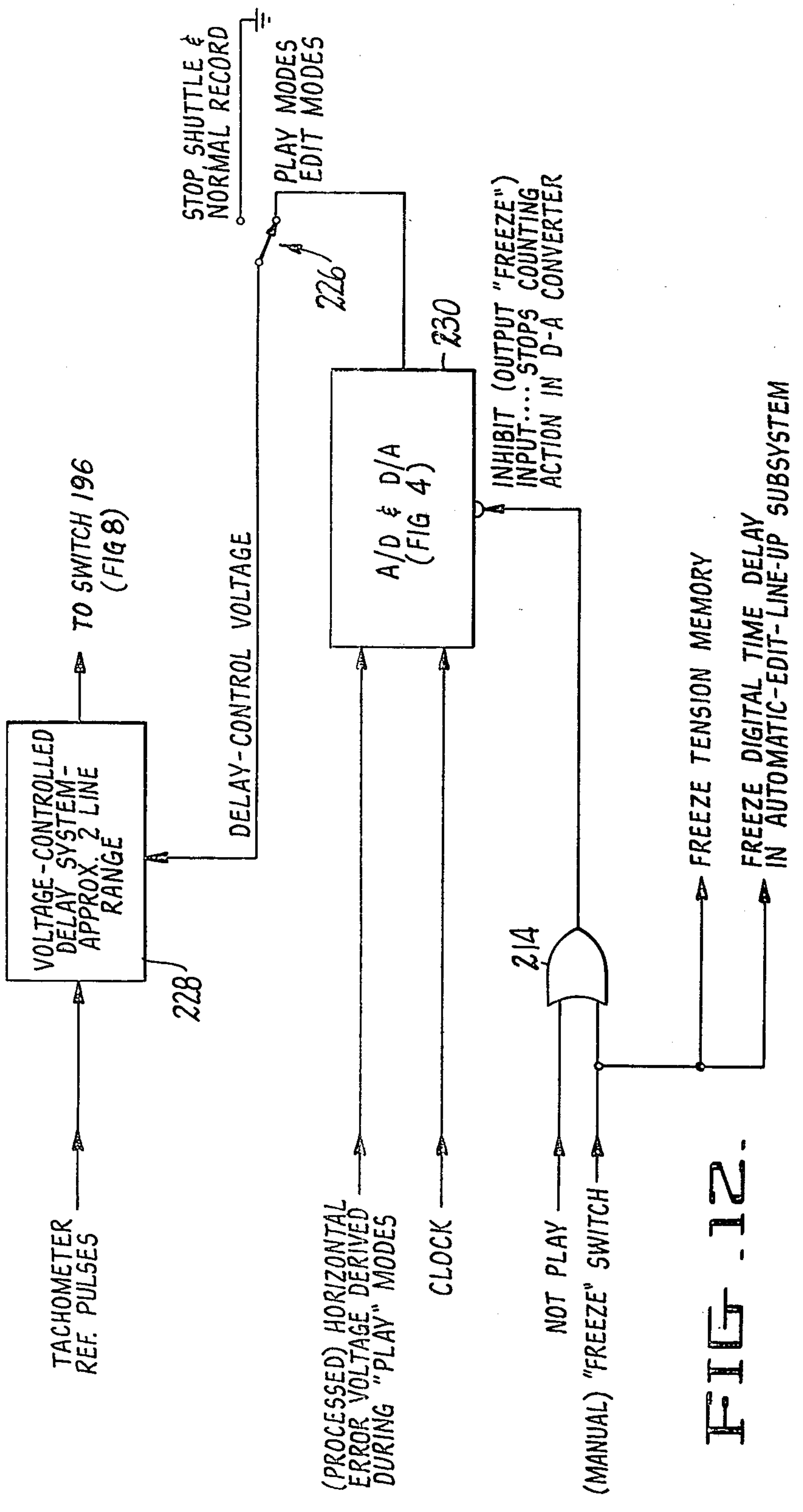
FIG. 12 is a block diagram of an alternative embodiment of the controllable delay of FIG. 8.

An alternative embodiment of the controllable delay 194 is shown in FIG. 12. Instead of providing a means in the path of the tachometer reference pulses for "digitally" delaying the pulses, as in FIG. 10, the tachometer reference pulses phase is altered by a voltage controlled delay means responsive to a delay control voltage which can be frozen in an analog-to-digital (A/D) and digital-to-analog (D/A) arrangement.

Figure 13:
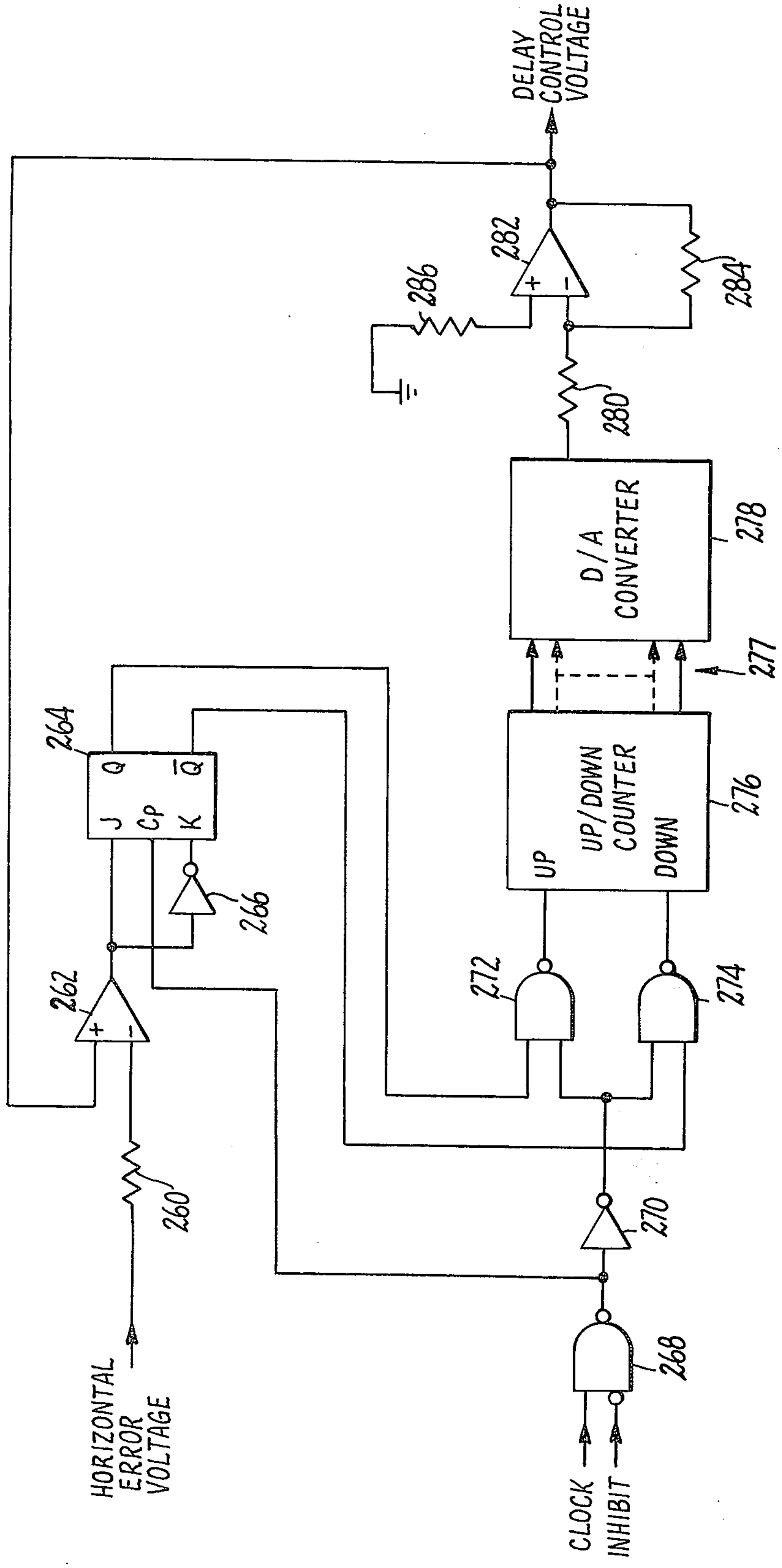
FIG. 13 is a block diagram of the A/D and D/A portion of FIG. 12.

The horizontal error voltage, clock and inhibit signal are applied to the A/D and D/A block 370, which is shown in greater detail in FIG. 13. The block 330 output analog voltage is applied through switch 326 to block 328 during play and edit VTR machine modes. During stop, shuttle and normal record modes a zero voltage is applied to block 328 via switch 326 connected to ground so that the tachometer reference pulse phase is not changed in those modes.

The voltage controlled delay system 328 may take many forms, for example, a voltage controlled one-shot. Alternately, the tachometer reference pulse can initiate a ramp voltage which is compared to the delay-control voltage in a comparator which produces a properly delayed output pulse to sample pulse gate 200.

Referring now to the details of FIG. 13, the horizontal error voltage is applied to the negative input of a comparator 362 through input resistor 360. As will be explained below, the positive input of comparator 362 receives the analog output of the A/D and D/A conversions. The output of comparator 362 is applied directly to the "J" input of J-K flip flop 364 and through an inverter 366 to the flip flop "K" input. The flip flop 364 "Q" output is connected to one input of NAND gate 374 and its "$\overline{Q}$" output is applied to one input of NAND gate 372.

A clock signal at 42 KHz, for example, is applied to one input NAND gate 68. The clock signal rate is not critical and can assume a wide range of values. The other input of gate 368 is "not-inhibit" so that there is no output from gate 368 in the inhibit mode and the count in block 376 is maintained. The output of gate 368 is applied to the clock pulse ($C_p$) input of flip flop 364 and the gate 368 output is applied to inverter 370 so that the other phase of the clock signal is applied to the other inputs of gates 372 and 374.

In operation the output of gate 372 provides an up-count at each clock pulse when the fed back analog signal (at the comparator positive input) from the A/D and D/A output is higher than error voltage (at the comparator negative input). Thus, up/down counter 376 counts up on consecutive clock pulses so long as the fed back voltage level exceeds in input level; counter 376 counts down when the fed back drops below the input level. The result is that the digital value in counter 376 and consequently the decoded analog value from D/A converter 378 follow the DC error input signal and when the clock pulses are stopped the digital value and resulting analog output is retained at the last clocked input value.

Counter 376 may have an 8-bit capacity, for example, which would require eight parallel lines 377 from counter 376 to D/A converter 378. Converter 378 may be a conventional ladder network, for example. In this environment, the D/A converter 378 need not be highly accurate but instead its resolution and stability are of greatest importance. That is, it is not significant that the analog output of converter 378 provide an accurate decoding of the digital value on lines 377 but rather that it resolve the digital values and retain the resulting analog value so long as the same digital input is present.

The analog output of converter 378 is inverted by operational amplifier 382 and is applied to the positive input of comparator 362. Amplifier 382 receives the converter 78 output through an input resistor 380 to its negative input. The positive input is referenced to ground through resistor 386. A conventional feedback resistor 384 is connected between the amplifier 382 output and its negative input.

The analog signal representative of the input DC analog signal is applied to switch 326 (see FIG. 11).

In operation, during a playback mode (play or edit play) the analog output from network 378 is proportional to the horizontal error voltage. The clock strobe rate is sufficiently high enough that a change in the input DC voltage results in a change in the analog output that is substantially instantaneous. When the edit record mode is entered it is desired to retain the last Dc error voltage. Hence, the inhibit input controls gate 368 so that the clock is stopped and the count in up-down counter 376 is held unchanged thus causing the decoded analog output from converter 378 to remain unchanged at the last playback horizontal error value.

Figure 14:
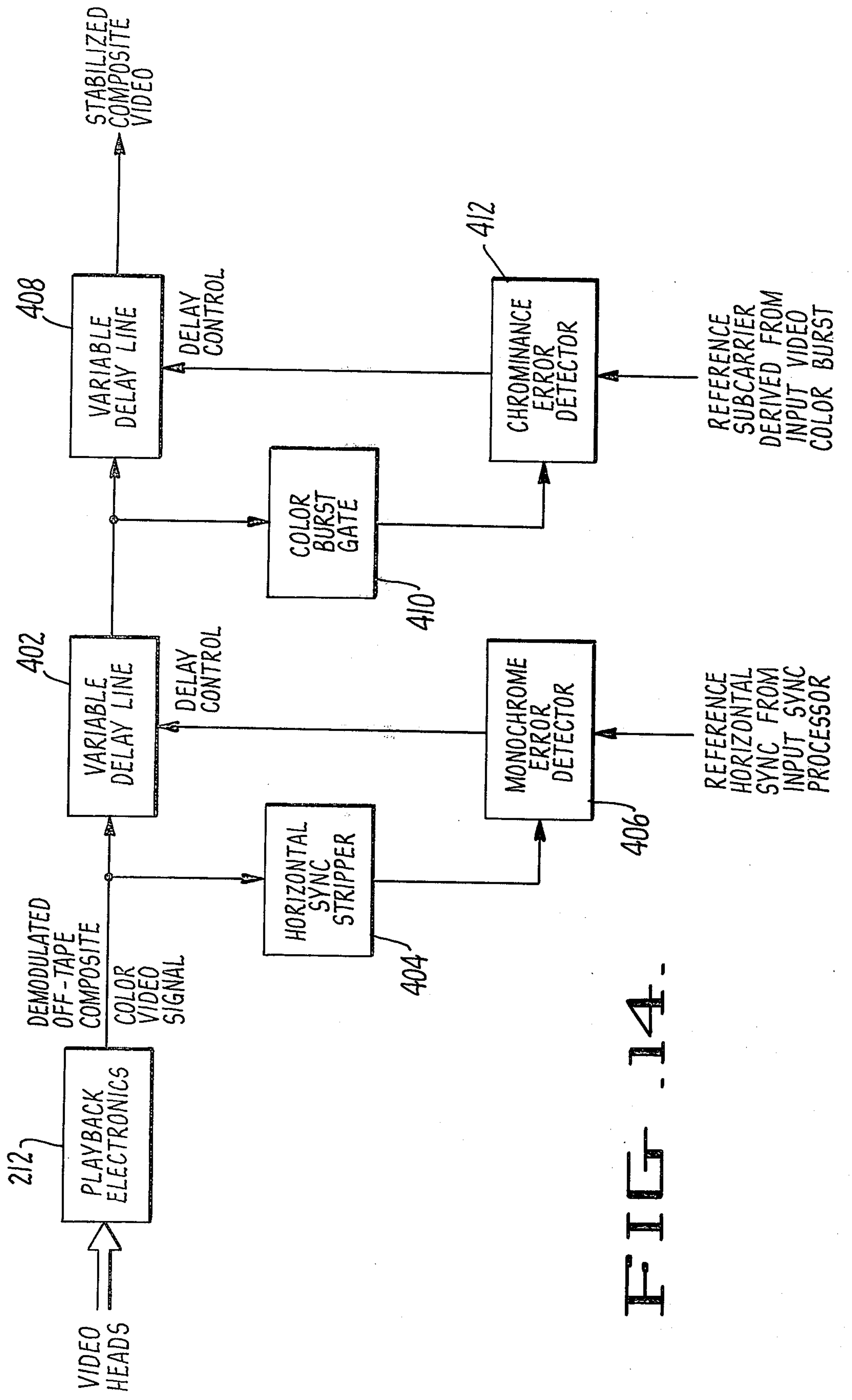
FIG. 14 is a block diagram of a time base corrector system, the operation of which is useful to an understanding of the present invention.

FIG. 14 shows a typical time base corrector arrangement. As explained above, the use of such a time base corrector, which is essential to provide a stable reproduced video signal, particularly for broadcast purposes, causes the color editing problem which is solved by the present invention.

The RF signal from the heads on scanner 42 is applied to playback electronics 212 which include head switching, head equalization, limiting and demodulation of the RF signal. The demodulated off-tape composite color video signal is applied to first and second variable delay lines 402 and 408. The first delay line 402 is controlled by a monochrome error detector 406 so as to bring the off-tape horizontal sync from sync stripper 404 into phase with the reference horizontal sync from the input video signal. The resulting signal from delay line 402 is stabilized sufficiently for good monochrome reproduction but still may contain errors sufficient to produce noticeable color errors in the reproduced picture. Thus to provide a fine correction a chrominance error detector 412 compares the off-tape color burst from gate 410 to a reference subcarrier derived from the input video color burst to provide a control signal for varying delay line 408 so that the off-tape burst and reference subcarrier are in phase. As discussed above, when the chrominance error detector encounters an abrupt 180° shift in the off-tape burst phase, it rapidly causes delay line 408 to change its delay by about 140 ns causing a noticeable movement in the reproduced picture.

Figure 15:
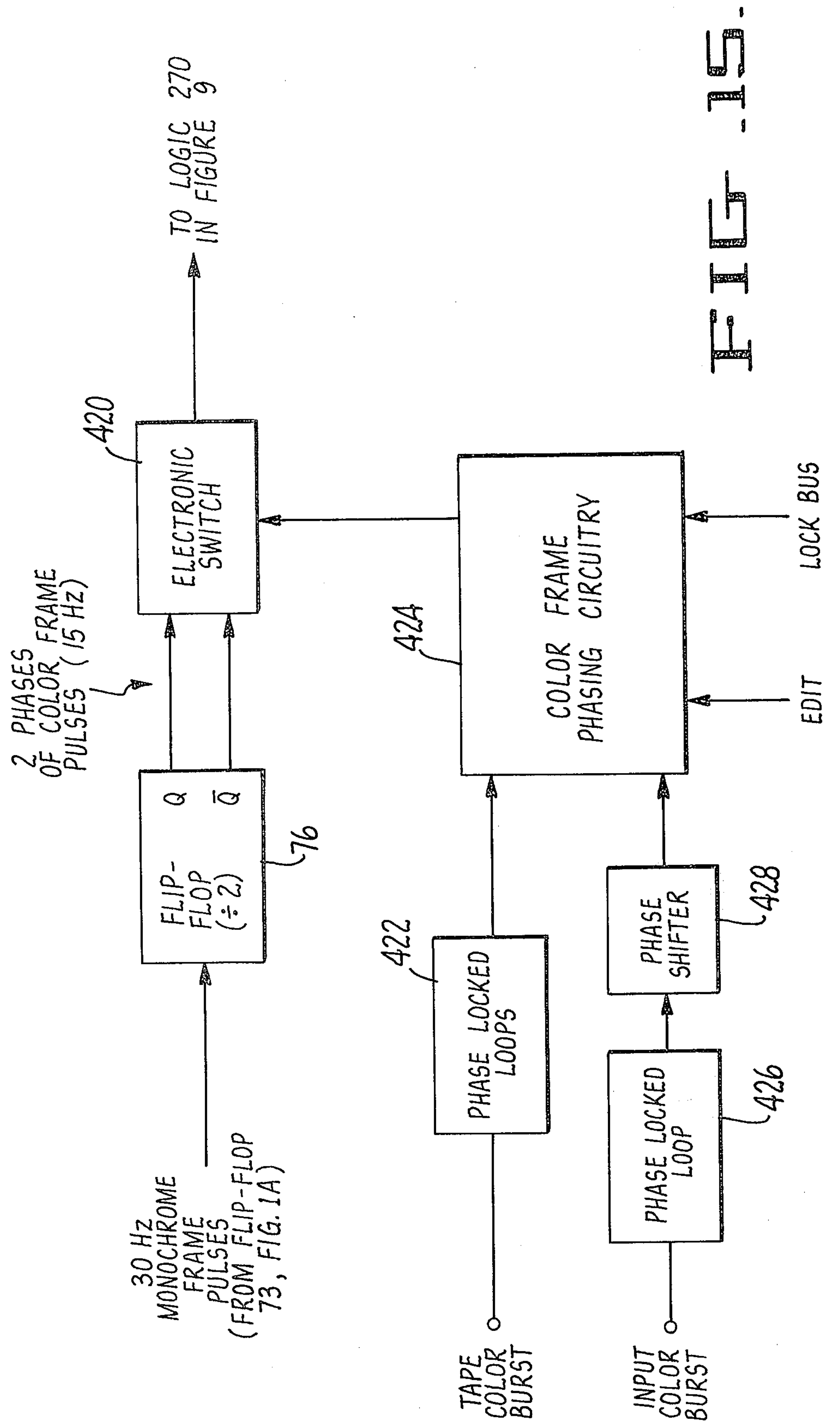
FIG. 15 is a block diagram of one embodiment of the invention.

Referring now to FIG. 15 of the drawings, one embodiment of the present invention is shown. The 30Hz monochrome frame pulses from flip-flop 73 of FIG. 1A are applied to flip-flop 76 (also FIG. 1A) which provides two outputs comprising the two phases of color frame pulses at its Q and $\overline{Q}$ outputs at a 15Hz rate. An electronic switch 420 selects either the Q or $\overline{Q}$ output for application to logic block 270 in FIG. 9 as the color reference frame signal.

Electronic switch 420 is controlled by color frame phasing circuitry 424. The off-tape color burst are applied to two phase locked loops 422 in order to stabilize the off-tape color burst signals. The off-tape color bursts are taken prior to color time base correction and subsequent to monochrome time base correction. The stabilized off-tape color burst signals are applied to the color frame phasing circuitry 424.

Color burst from the input video signal are applied to a phased lock loop 426 and to a phase shifter 428 for application to the color frame phasing circuitry 424. Only a single phase locked loop is used for stabilizing the input color burst because this signal will be substantially more stable than the off-tape color burst signal.

Color frame phasing circuitry 424 also receives an input indicating that the video tape recorder is or is not in the edit mode of operation (record and playback) and an indication that the video tape recorder has achieved horizontal lock or synchronization according to the signal on the lock bus.

Figure 16:
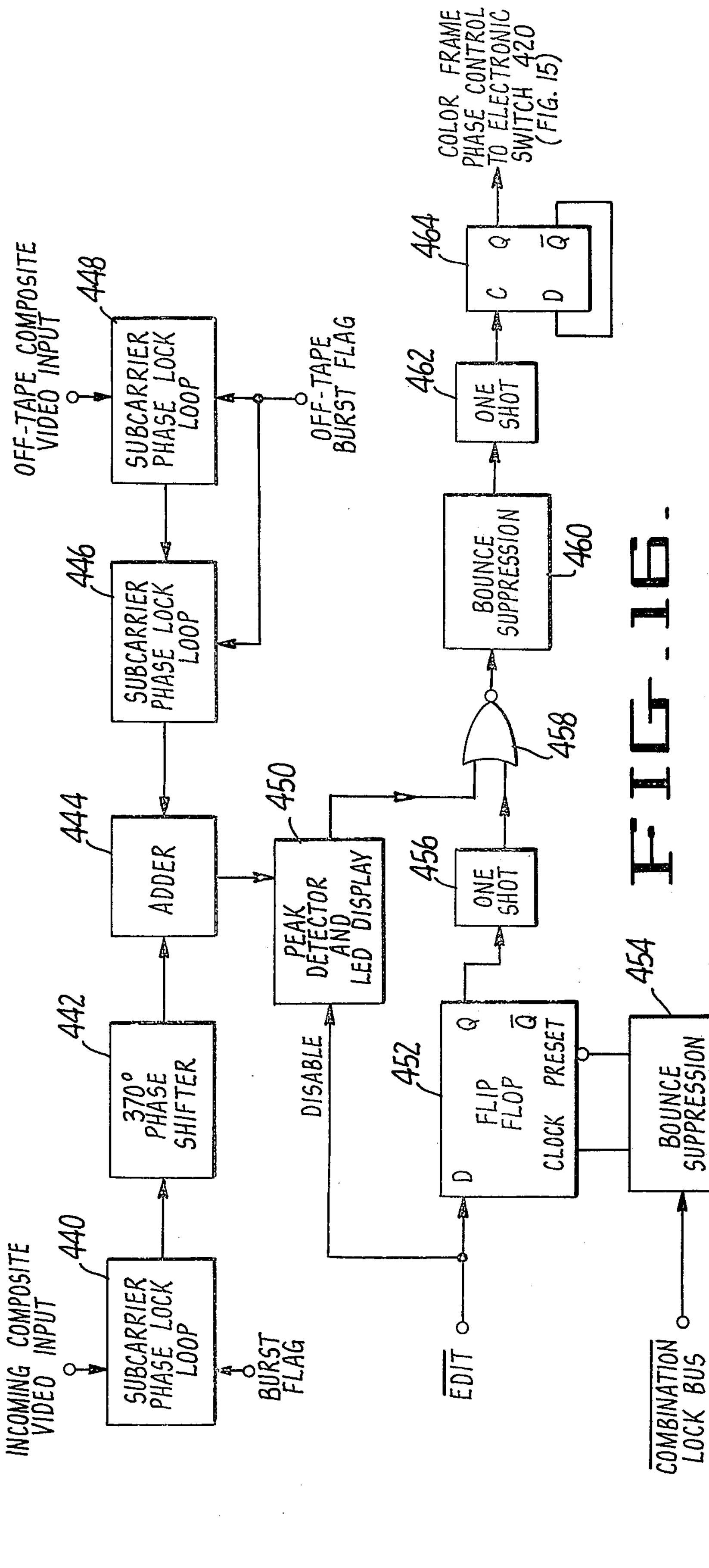
FIG. 16 is a more detailed block diagram of an embodiment of the invention.

FIG. 16 shows the embodiment of FIG. 15 in greater detail. In actual practice, the composite video of the input signal is applied to subcarrier phase lock loop 440 which also receives a burst flag input derived by conventional circuitry not shown so that its output is a continuous subcarrier following the average phase of the color burst of the input video signal. This subcarrier is applied to a 370° phase shifter 442. Details of such a phase shifter are disclosed in the above reference patent application of the present inventor, Ser. No. 355,781, filed Apr. 30, 1973. The function of phase shifter 442 is to provide a variable control of the subcarrier phase over a substantial angle. The phase shifter output is applied to a conventional adder 444.

The off-tape composite video is applied to a subcarrier phase lock loop 448 which also receives a burst flag derived from conventional circuitry which is not shown. The loop output is a continuous subcarrier following the phase of the off-tape color burst. In order to further stabilize the subcarrier and remove jitter the burst flag and subcarrier phase lock loop 448 output are also applied to a second subcarrier phase lock loop 446 which provides a relatively stable subcarrier following the average phase of the off-tape subcarrier to adder 444.

The 370° phase shifter 442 can be adjusted so that the subcarrier inputs to adder 444 have any relative phase, including no phase difference and 180° phase difference.

The output of adder 444 is applied to a peak detector and LED display 450. The details of one suitable peak detector are disclosed in a U.S. patent application of the present inventor, Ser. No. 320,092, filed Jan. 2, 1973. Other types of known prior art peak detectors may also be employed. Also, other types of sensory displays other than LED's may be used. Block 450 permits an operator to adjust shifter 442 so that the maximum signal is obtained from adder 444 by placing the two subcarriers in phase with each other. It will be apparent that the phase shifter 442 could alternately have been placed in a line coming from subcarrier phase lock loop 446.

When the video tape recorder is locked and the machine has been placed in the edit mode by an operator the Q output of flip-flop 452 will go low. Flip-flop 452 is a D-type flip-flop that transfers data at its "D" input on the edge of a clock pulse. The preset input overrides other inputs and causes Q to go high. Bounce suppression block 454 prevents false action by requiring that the lock bus signal have at least a predetermined pulse width.

If the machine is not in the edit mode then the peak detector and LED display 450 is disabled.

A low output at flip-flop 452 causes one-shot 456 to fire and apply a signal to NOR-gate 458. The other input of NOR-gate 458 is received from the output of peak detector and LED display 450. When the two subcarrier inputs to adder 444 are in phase the LED light display is lit and the output of the peak detector is low. The inputs to NOR-gate 458 must therefore be both low in order to provide a high output to bounce suppression block 460, which functions in the same manner as block 454 to pass a signal only in response to a predetermined pulse width input. Both bounce suppression circuits prevent false signalling by transients or the like. When the output of NOR-gate 458 is low for a sufficient period of time the one-shot 162 is therefore fired, which is connected to the clock input of D type flip-flop 464. Upon receipt of a clock pulse, flip-flop 464 will change state.

The output of flip-flop 464 is applied to the electronic switch 420 of FIG. 16, causing the switch to select the Q phase of the color frame pulses in response to a first signal or high signal from flip-flop 464 and for selecting the $\overline{Q}$ phase of the color frame pulses in response to a second signal or low signal from flip-flop 464.

Thus, by adjusting the 370° phase shifter to provide in phase subcarriers at adder 444, a particular phase relationship between the off-tape color burst and incoming video color burst is established and causes the choice of a particular one of the two phases of the color frame pulses. This selection of color frame pulse phase may be incorrect, as explained below. If the choice is incorrect, a reversal of the off-tape color burst phase to input video color burst phase is achieved by causing the two subcarriers to be 180° out of phase at adder 444. This is accomplished by changing the phase shift in phase shifter 442 until the LED display no longer displays a light, indicating that there is no output from adder 444 because the two subcarriers are out of phase and therefore cancel each other. It will be apparent that other means can be provided for detecting that the two subcarriers are out of phase at adder 444. The relationship of off-tape color burst to incoming video color burst with relationship to the two phases of the color frame pulses has now been reversed and as will be explained below, the correct phase of color frame will automatically be chosen in the event that the first phase relationship of off-tape color burst to input video color burst was incorrect.

In operation, the operator of the video tape recorder places the VTR in its edit playback mode and either initiates the automatic edit line-up as shown in FIGS. 2 and 3 or initiates the manual edit line-up. If the manual edit line-up is chosen, the operator must set delay control 126 in FIG. 2 or FIG. 3 in order to align the edit line-up display pulses on the television monitor. Edit line-up is achieved by controlling the delay in the input sync processor so that the capstan and scanner servos cause the video tape recorder to become synchronized or lock up to the input video signal to be edit recorded. As described in connection with the servo systems of the video tape recorder, particularly with reference to FIGS. 8 through 13, the VTR first achieves capstan framing. This framing is accomplished at the color frame rate by a comparison of the signal from electronic switch 420 of FIG. 15 to a signal derived from the control track representing the color frame of the off-tape signal. As mentioned above, this synchronization can result in a lock up to the incorrect phase of the color frame pulses.

Figure 17:
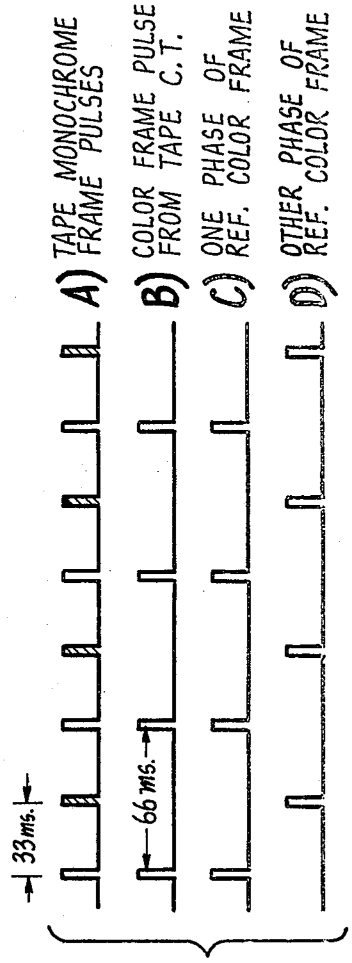
FIG. 17A–D is a series of waveforms useful in understanding the invention.

This effect may be better appreciated with reference to FIG. 17A through D. FIG. 17A shows the 30Hz monochrome frame pulses of the video signal previously recorded on the tape. The shaded pulses are assumed to be the correct color frame pulses. It will be recalled, however, that there is no unique way to recognize the color frame pulses per se. The spacing between the monochrome frame pulses of FIG. 17A is approximately 33 milioseconds. FIG. 17B shows the color frame pulses as separated from the off-tape control track signals. These pulses are separated by 66 miliseconds and have a 15Hz rate. FIGS. 17C and 17D show the two possible phases of the color frame reference pulses derived from the input color video signal. These are the two phases of pulses present at the output of flip-flop 76 in FIGS. 1A and 15. Depending on which phase (17C or 17D) of the color frame reference signals are chosen, the color frame pulses derived from the control track of the previously recorded tape will either lock to the pulses of FIG. 17C or 17D. It will be appreciated from the discussion of the VTR servo systems that the servo system moves the VTR capstan such that the pulses of FIG. 17B align themselves with those of 17C or 17D. Thus the FIG. 17B pulses are shown synchronized with the reference pulses of FIG. 17C. This is assumed to be the incorrect color frame. By means of the circuitry described in conjunction with FIGS. 15 and 16, the phase of the color frame reference pulses derived from the input video signal is reversed and the FIG. 17B pulses would lock to those of FIG. 17D, thereby achieving the correct color framing.

It will be appreciated that as part of the edit line-up procedure that a tach lock of the scanner servo is achieved followed by a horizontal lock of the VTR scanner servo. Following the achieving of horizontal lock a test edit is made by placing the machine into the edit record mode. It will be recalled from the discussion of FIGS. 10 through 13 in particular that the horizontal error is stored so that the machine timing during edit record is maintained to be the same as that during edit playback, thereby maintaining the correct timing with the possible exception of having chosen the incorrect color frame. The tape is then rewound as necessary and played back to determine if there is an abrupt 180° phase shift of the color subcarrier at the edit point. As mentioned above, such a phase shift causes a noticeable shifting in the picture. If no shift was noted, then the circuitry of FIGS. 15 and 16 is properly set up so that the VTR will always lock to the correct color frame so long as the horizontal sync to color burst phase of the input video signal remains substantially constant. In the event that the incorrect color frame was locked to the circuitry of FIGS. 15 and 16 is adjusted so that the opposite phase of the color frame pulses will be chosen.

It will be appreciated that the accuracy and stability of the input sync processor of the VTR is important to the operation of the invention. Such an input sync processor or its equivalent is required to assure that the present invention will cause the VTR to lock to the correct color frame. For example, the present invention involves a comparison of the input color burst to the off-tape color burst and it is looking for a 180° change in the phase relationship. In the NTSC color television system one cycle of the color burst is 280 nanoseconds. In the input sync processor described herein, one pulse of the 7.875MHz clock is 127 nanoseconds or approximately one-half cycle of the color burst. Thus, one clock pulse is about 180° change in the color burst. It is essential therefore that the VTR maintain its timing within one clock pulse subsequent to the initial edit line-up.

It will be appreciated that the present invention provides automatic color framing once the initial set-up of the circuitry according to the present invention has been accomplished. This is based on the recognition of the fact that the relative phase of the input video color burst and the off-tape color burst provides a prediction of the selection of color frame pulse phase for use in framing the VTR capstan servo.

Those of ordinary skill in the art will appreciate that the circuitry of FIGS. 15 and 16 may be modified within the teachings of the present invention. For example, means other than that disclosed may be provided for comparing the phase of the off-tape color burst to the input video color burst and recognizing when the correct color frame results from that phase relationship or from a 180° shifted phase relationship of the color bursts. Also, it will be apparent that the phase of the color frame pulses derived from the tape control track can be changed in phase instead of changing the phase of the reference color frame pulses. These and other modifications within the ordinary skill in the art are contemplated by the present invention. Also, although the invention has been described with reference to a particular video tape recorder and portions thereof, subject to the qualifications stated in this application, the invention may be used in the context of other video tape recorders. The invention is therefore to be limited only by the scope of the appended claims.

It will be apparent to those of ordinary skill in the art that the present invention is also applicable to PAL color framing, although modifications are, of course, required to accommodate the 8 frame PAL color sequence.

I claim:

1. A method for providing automatic color framing in a video tape recorder wherein incoming color video signals having substantially stable horizontal sync to color burst phase are edit recorded adjacent previously recorded color video signals having a substantially stable horizontal sync to color burst phase, said video tape recorder including means for synchronizing in one of two possible phase relationships a signal at the color frame rate of the previously recorded color video signals with a reference signal at the color frame rate derived from the incoming color video signals, the method comprising comparing the phase relation of the color burst of the incoming color video signals to the color burst of the reproduced previously recorded color video signals to define said phase relation as the first phase relation to associate said first phase relation with synchronization in one of said two possible phase relationships of said signal at the color frame rate of the previously recorded color video signals and said reference signal at the color frame rate derived from the incoming color video signals, and to define a 180° shifted phase relation of said color bursts as the second phase relation to associate said second phase relation with synchronization in the other of said two possible phase relationships of said signal at the color frame rate of the previously recorded color video signals, edit recording said incoming color video signals adjacent said previously recorded color video signals, reproducing said previously recorded color video signals and said newly edited recorded incoming color video signals, reversing the association of said first and second phase relations of said color bursts to said possible phase relationships of said signal at the color frame rate of the previously recorded color video signals and said reference signal at the color frame rate derived from the incoming color video signals when the reproduced previously recorded color video signals and said newly edited recorded color video signals have a 180° color burst phase shift at the edit point whereby the comparison of the phase relation of the color burst of the incoming color video signals to the color burst of the reproduced color video signals to determine if said phase relation is substantially said first or substantially said second phase relation causes synchronization in the associated one of said two possible phase relationships of said signal at the color frame rate of the previously recorded color video signals and said reference signal at the color frame rate derived from the incoming color video signals.

2. The method of claim 1 wherein said step of comparing the phase relation of the color burst of the incoming color video signals to the color burst of the reproduced previously recorded color video signals includes the steps of generating a first stable color subcarrier signal in response to said color burst of the incoming color video signals, generating a second stable color subcarrier signal in response to said color burst of the reproduced previously recorded color video signals, and comparing the phase relation of said first and second stable color subcarrier signals.

3. In a video tape recorder wherein incoming color video signals having substantially stable horizontal sync to color burst phase are edit recorded adjacent previously recorded color video signals having a substantially stable horizontal sync to color burst phase, said video tape recorder including means for synchronizing in one of two possible phase relationships a signal at the color frame rate of the previously recorded color video signals with a reference signal at the color frame rate derived from the incoming color video signals, color framing apparatus comprising means for comparing the phase relation of the color burst of the incoming color video signals to the color burst of the reproduced previously recorded color video signals to generate a first signal when said phase relation is $\Theta°$ and to generate a second signal when said phase relations is $\Theta + 180°$, means for applying said first and second signals to said means for synchronizing to synchronize said color frame rate signals in a first phase relationship in response to said first signal and to synchronize said color frame rate signals in a second phase relationship in response to said second signal, and means for reversing said first and second signals.

4. The combination of claim 3 wherein said means for comparing the phase relation of said color bursts includes means for generating a first stable color subcarrier in response to said color burst of the input color video signals, means for generating a second stable color subcarrier signal in response to said color burst of the reproduced previously recorded color video signals, and means for comparing the phase relation of said first and second stable color subcarrier signals.

5. The combination of claim 4 wherein said means for comparing the phase relation of said first and second stable color subcarrier signals comprises means for adding said first and second stable subcarrier signals, and means for detecting the relative amplitude of said added first and second stable subcarrier signals to detect the relative phase of said subcarrier signals.

6. The combination of claim 5 wherein said means for reversing said first and second signals comprises means for shifting the phase of one of said subcarrier signals.

7. In a video tape recorder wherein incoming color video signals having substantially stable horizontal sync to color burst phase are edit recorded adjacent previously recorded color video signals having a substantially stable horizontal sync to color burst phase, said video tape recorder including means for synchronizing in one of two possible phase relationships a signal at the color frame rate of the previously recorded color video signals with a reference signal at the color frame rate derived from the incoming color video signals, the relative phase of the incoming video signals' color burst to the previously recorded video signals' color burst defining the correct phase relationship of said color frame rate signals, color framing apparatus comprising means for comparing the phase relation of the color burst of the incoming color video signals to the color burst of the reproduced previously recorded color video signals to generate a first signal when said phase relation is Θ° and to generate a second signal when said phase relation is Θ + 180°, and means for applying said first and second signals to said means for synchronizing to synchronize said color frame rate signals in a first phase relationship in response to said first signal and to synchronize said color frame rate signals in a second phase relationship in response to said second signal.

8. The combination of claim 7 wherein said means for comparing the phase relation of said color bursts includes means for generating a first stable color subcarrier in response to said color burst of the input color video signals, means for generating a second stable color subcarrier signal in response to said color burst of the reproduced previously recorded color video signals, and means for comparing the phase relation of said first and second stable color subcarrier signals.

9. The combination of claim 8 wherein said means for comparing the phase relation of said first and second stable color subcarrier signals comprises means for adding said first and second stable subcarrier signals, and means for detecting the relative amplitude of said added first and second stable subcarrier signals to detect the relative phase of said subcarrier signals.

* * * * *